(12) United States Patent
Dabrowski

(10) Patent No.: US 10,553,004 B2
(45) Date of Patent: Feb. 4, 2020

(54) METHOD AND APPARATUS FOR PROCESSING IMAGE AND RECORDING MEDIUM STORING PROGRAM THEREFOR

(71) Applicant: Samsung Electronics Co., Ltd., Suwon-si, Gyeonggi-do (KR)

(72) Inventor: Piotr Henryk Dabrowski, Ksawerow (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 15/404,782

(22) Filed: Jan. 12, 2017

(65) Prior Publication Data

US 2017/0228905 A1 Aug. 10, 2017

(30) Foreign Application Priority Data

Feb. 5, 2016 (KR) .................. 10-2016-0014987

(51) Int. Cl.
*G06K 9/36* (2006.01)
*G06T 11/60* (2006.01)
*G06T 5/50* (2006.01)

(52) U.S. Cl.
CPC ............ *G06T 11/60* (2013.01); *G06T 5/50* (2013.01); *G06T 2207/10024* (2013.01)

(58) Field of Classification Search
None
See application file for complete search history.

(56) References Cited

U.S. PATENT DOCUMENTS

| 5,974,198 | A | 10/1999 | Hamburg et al. |
| 6,229,930 | B1* | 5/2001 | Kadono ............. H04N 19/00 382/236 |
| 6,891,550 | B1 | 5/2005 | Nolan |
| 7,054,029 | B1* | 5/2006 | Ohta ................. H04N 1/3871 358/1.12 |
| 7,088,375 | B1 | 8/2006 | Hamburg |
| 7,733,350 | B2 | 6/2010 | Lefebvre et al. |
| 8,768,097 | B2* | 7/2014 | Wang ................. G06T 3/4038 345/629 |
| 9,485,438 | B2* | 11/2016 | Sakaniwa ........... H04N 7/181 |

(Continued)

OTHER PUBLICATIONS

PNG (Portable Network Graphics) Specification Version 1.0, Oct. 1, 1996, http://www.w3.org/TR/PNG-DataRep.html#DR_Alphachannel.

(Continued)

*Primary Examiner* — Randolph I Chu
(74) *Attorney, Agent, or Firm* — Jefferson IP Law, LLP

(57) ABSTRACT

An image processing method and an apparatus are provided. The image processing method includes acquiring first image data including a plurality of target pixels, acquiring synthesis information by which a relationship, between each of the plurality of target pixels included in the first image data and at least one background pixel included in different image data to be synthesized with the first image data, is determined, and synthesizing a target pixel of the first image data with the at least one background pixel of second image data, based on the synthesis information according to determination of the second image data. The second image data includes the different image data to be synthesized with the first image data.

11 Claims, 18 Drawing Sheets

(56) References Cited

U.S. PATENT DOCUMENTS 9,508,173 B2\* 11/2016 Miura ................... G06T 11/60
10,235,785 B2\* 3/2019 Nakajo ................. H04N 1/387

OTHER PUBLICATIONS

Stuart Parmenter et al., APNG Specification, MozillaWiki, APNG 1.0, Sep. 26, 2015, https://wiki.mozilla.org/APNG_Specification.
MNG (Multiple-image Network Graphics) Home Page, Jan. 11, 2015, http://www.libpng.org/pub/mng/.

\* cited by examiner

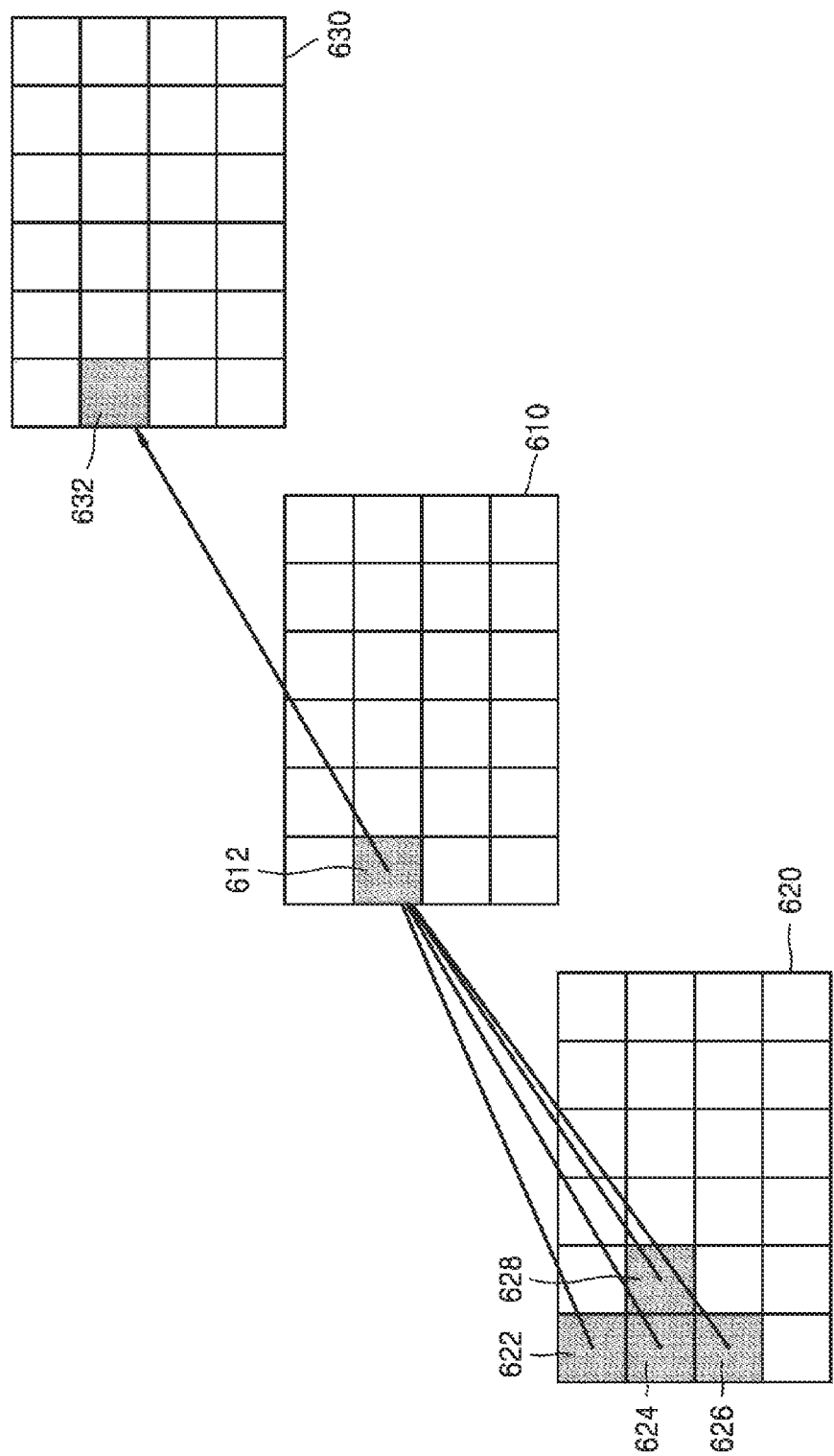

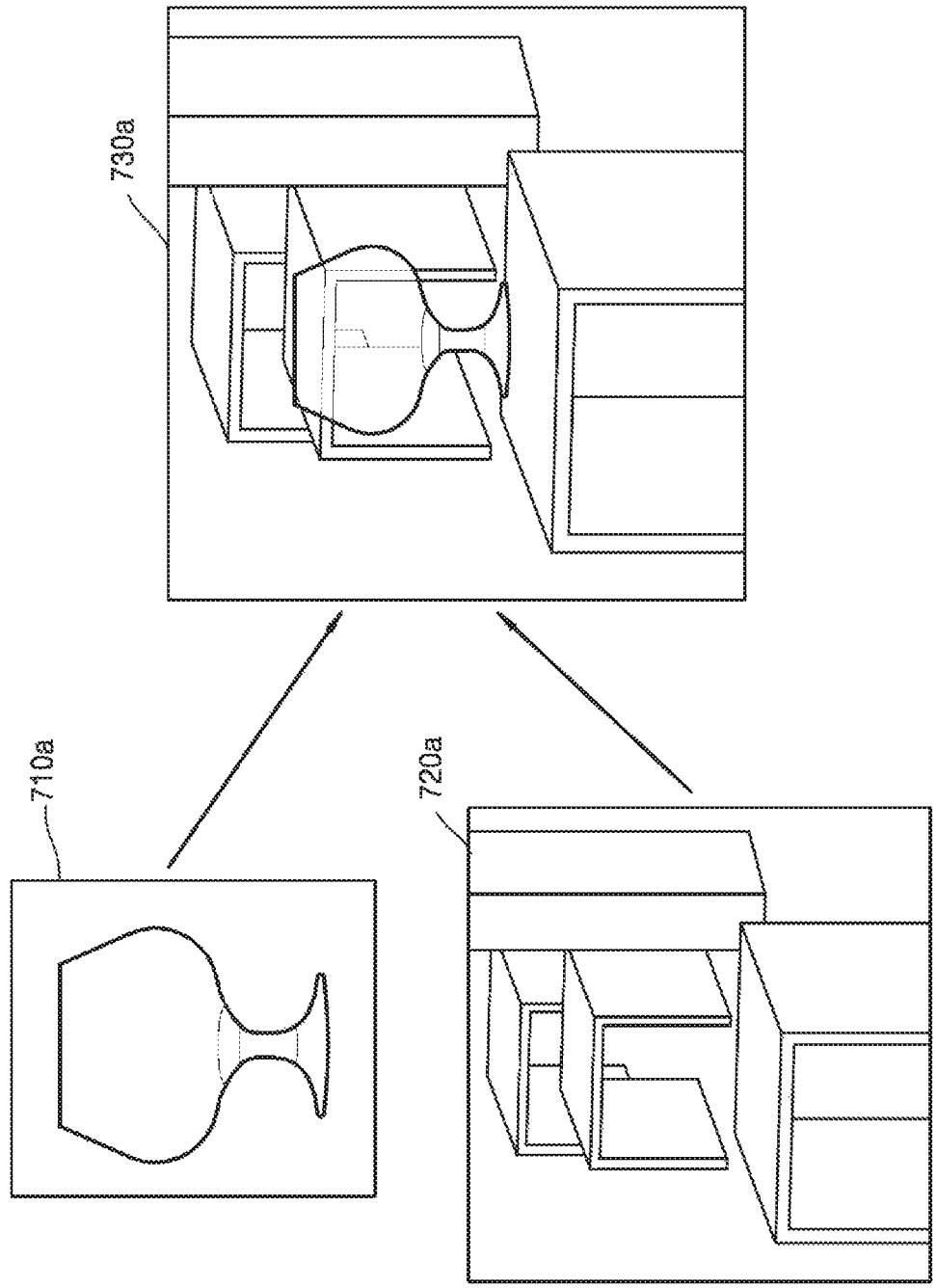

METHOD AND APPARATUS FOR PROCESSING IMAGE AND RECORDING MEDIUM STORING PROGRAM THEREFOR

CROSS-REFERENCE TO RELATED APPLICATION(S)

This application claims the benefit under 35 U.S.C. § 119(a) of a Korean patent application filed on Feb. 5, 2016 in the Korean Intellectual Property Office and assigned Serial number 10-2016-0014987, the entire disclosure of which is hereby incorporated by reference.

TECHNICAL FIELD

The present disclosure relates to an image processing method, an image processing apparatus, and a non-transitory computer-readable recording medium having recorded thereon a program for performing the image processing method.

BACKGROUND

An image may be represented by a two-dimensionally arranged bitmap in which the nature of each of a plurality of pixels is defined. For example, an image may be represented by a two-dimensionally arranged bitmap in which red, green, and blue (RGB) values indicating a color of each pixel and a transparency value indicating transparency of each pixel are defined.

Recently, to provide an image capable of giving a sense of reality to a user, the development of image synthesis techniques for effectively synthesizing different images has been actively conducted. However, the existing image synthesis techniques have a problem in that values of pixels constituting different images are simply combined, thereby generating synthesized image data of which a visual effect is degraded. In addition, techniques of three-dimensionally synthesizing images, such as a three-dimensional (3D) graphic pixel shader, have a problem in that the synthesizing of images is costly and time consuming.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide image processing methods and image processing apparatuses capable of effectively acquiring a visual effect according to synthesis of different images by converting and combining an image and a different image based on synthesis information of the image when the image and the different image are synthesized.

In accordance with an aspect of the present disclosure, an image processing method is provided. The image processing method includes acquiring first image data including a plurality of target pixels, acquiring synthesis information by which a relationship, between each of the plurality of target pixels included in the first image data and at least one background pixel included in different image data to be synthesized with the first image data, is determined, and synthesizing a target pixel of the first image data with the at least one background pixel of second image data, based on the synthesis information according to determination of the second image data, wherein the second image data comprises the different image data to be synthesized with the first image data.

The synthesis information may include a synthesis function in which at least one or more of the following are set as parameters: a color value and a transparency value of the target pixel, position information of the target pixel in the first image data, a color value and a transparency value of the at least one background pixel, position information of the at least one background pixel in the second image data, size information of the first image, and size information of the second image data.

The synthesizing of the target pixel may include converting the color values and the transparency values of the target pixel and the at least one background pixel based on the synthesis function and synthesizing a result the converting with the color value of the target pixel according to a ratio determined based on the transparency value of the target pixel.

The first image data may include a color channel in which a color value of each of the plurality of target pixels is stored, an alpha channel in which a transparency value of each of the at least one background pixel is stored, and a synthesis channel in which the synthesis information of each of the plurality of target pixels is stored, wherein the acquiring of the synthesis information may include acquiring the synthesis information of each of the plurality of target pixels from the synthesis channel included in the first image data.

The acquiring of the synthesis information may include acquiring the synthesis information of each of the plurality of target pixels included in the first image data from a synthesis channel separated from the first image data.

The image processing method may further include determining at least one background pixel corresponding to each of the plurality of target pixels included in the first image data, based on the synthesis information.

In accordance with another aspect of the present disclosure, an image processing method may include acquiring a color value and a transparency value of each of a plurality of target pixels included in first image data, determining a relationship between each of the plurality of target pixels and at least one background pixel included in different image data to be synthesized with the first image data, based on the color value and the transparency value of each of the plurality of target pixels, and generating synthesis information indicating the determined relationship with respect to each of the plurality of target pixels.

The image processing method may further include storing the synthesis information of each of the plurality of target pixels in a synthesis channel included in the first image data.

The image processing method may further include storing the synthesis information of each of the plurality of target pixels included in the first image data, in a synthesis channel separated from the first image data.

The image processing method may further include identifying an object included in the first image data, wherein the determining of the relationship includes determining the relationship between each of the plurality of target pixels and the at least one background pixel included in the different image data, based on a characteristic of the identified object and the color value and the transparency value of each of the plurality of target pixels.

In accordance with another aspect of the present disclosure, an image processing method is provided. The image processing method includes acquiring first image data including a plurality of target pixels and second image data including a plurality of background pixels and synthesizing the first image data and the second image data based on synthesis information by which a relationship between each of the plurality of target pixels and each of the plurality of background pixels is determined.

The synthesizing of the first image data and the second image data may include converting color values and transparency values of the plurality of target pixels and at least one background pixel corresponding to each of the plurality of target pixels, based on the synthesis information.

In accordance with another aspect of the present disclosure, an image processing apparatus is provided. The image processing apparatus includes an image acquirer configured to acquire first image data including a plurality of target pixels, a decoder configured to acquire synthesis information by which a relationship between each of the plurality of target pixels included in the first image data and at least one background pixel included in different image data to be synthesized with the first image data is determined, and at least one processor configured to synthesize a target pixel of the first image data with the at least one background pixel of second image data, based on the synthesis information according to determination of the second image data, wherein the second image data comprises the different image data to be synthesized with the first image data.

The synthesis information may include a synthesis function in which a color value and a transparency value of the target pixel, position information of the target pixel in the first image data, a color value and a transparency value of the at least one background pixel, position information of the at least one background pixel in the second image data, size information of the first image data, and size information of the second image data are set as parameters.

The at least one processor may be further configured to convert the color values and the transparency values of the target pixel and the at least one background pixel based on the synthesis function, and synthesize a result of the converting with the color value of the target pixel according to a ratio determined based on the transparency value of the target pixel.

The first image data may include a color channel in which a color value of each of the plurality of target pixels is stored, an alpha channel in which a transparency value of each of the at least one background pixel is stored, and a synthesis channel in which the synthesis information of each of the plurality of target pixels is stored, wherein the decoder may be further configured to acquire the synthesis information of each of the plurality of target pixels from the synthesis channel included in the first image data.

The decoder may be further configured to acquire the synthesis information of each of the plurality of target pixels included in the first image data from the synthesis channel separated from the first image data.

The at least one processor may be further configured to determine at least one background pixel corresponding to each of the plurality of target pixels included in the first image data, based on the synthesis information.

In accordance with another aspect of the present disclosure, an image processing apparatus is provided. The image processing apparatus includes an image acquirer configured to acquire first image data a decoder configured to acquire a color value and a transparency value of each of a plurality of target pixels included in the first image data and at least one processor configured to determine a relationship between each of the plurality of target pixels and at least one background pixel included in different image data to be synthesized with the first image data, based on the color value and the transparency value of each of the plurality of target pixels, and generate synthesis information indicating the determined relationship with respect to each of the plurality of target pixels.

The at least one processor may be further configured to store the synthesis information of each of the plurality of target pixels in a synthesis channel included in the first image data.

The at least one processor may be further configured to store the synthesis information of each of the plurality of target pixels included in the first image data, in a synthesis channel separated from the first image data.

The at least one processor may be further configured to identify an object included in the first image data and determine the relationship between each of the plurality of target pixels and the at least one background pixel included in the different image data, based on a characteristic of the identified object and the color value and the transparency value of each of the plurality of target pixels.

In accordance with another aspect of the present disclosure, an image processing apparatus includes an image acquirer configured to acquire first image data including a plurality of target pixels and second image data including a plurality of background pixels, and at least one processor configured to synthesize the first image data and the second image data based on synthesis information by which a relationship between each of the plurality of target pixels and each of the plurality of background pixels is determined.

The at least one processor may be further configured to convert color values and transparency values of the plurality of target pixels and at least one background pixel corresponding to each of the plurality of target pixels, based on the synthesis information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates a diagram for describing a method by which an image processing apparatus generates synthesized image data by synthesizing first image data and second image data according to an embodiment of the present disclosure;

FIG. 7A illustrates a diagram for describing a method by which an image processing apparatus generates synthesized image data based on first image data and second image data according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "and/or" includes any and all combinations of one or more of the associated listed items. Expressions such as "at least one of," when preceding a list of elements, modify the entire list of elements and do not modify the individual elements of the list.

Figure 1:
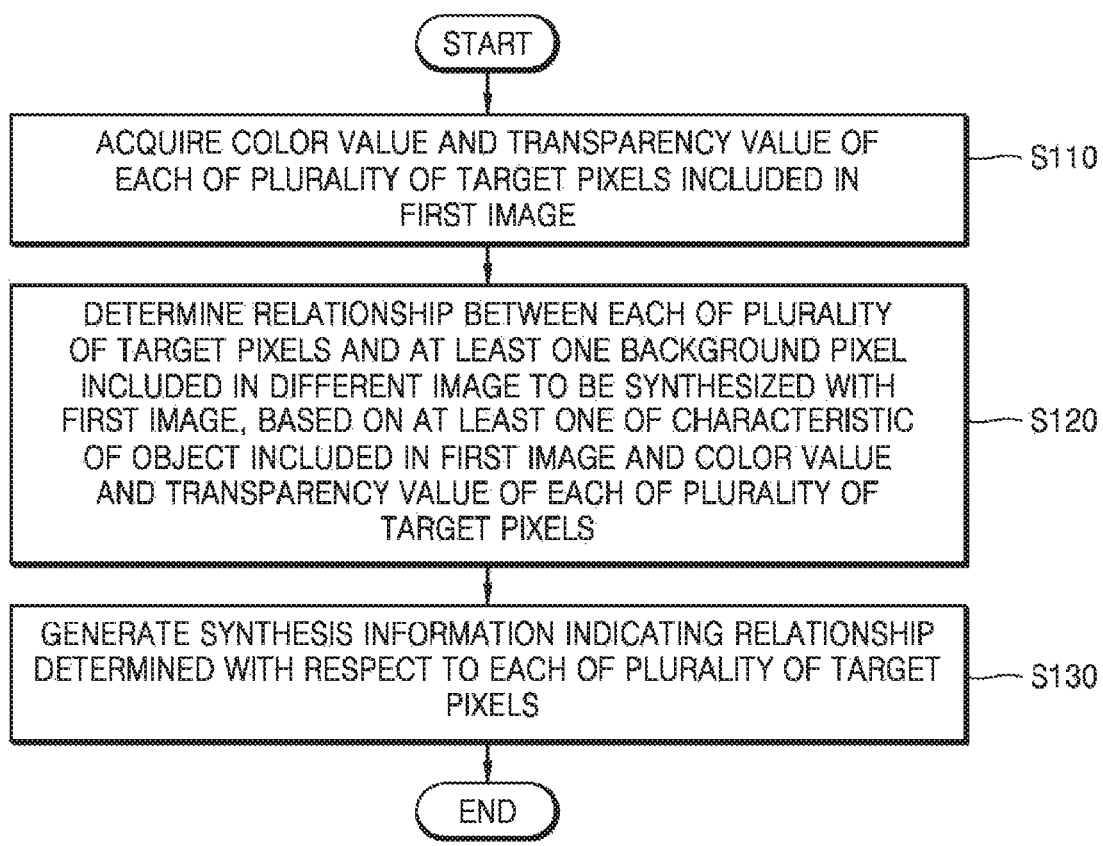
FIG. 1 illustrates a flowchart of a method by which an image processing apparatus generates synthesis information to be used for image synthesis according to an embodiment of the present disclosure.

FIG. 1 illustrates a flowchart of a method by which an image processing apparatus generates synthesis information to be used for image synthesis according to an embodiment of the present disclosure.

Referring to FIG. 1, in operation S110, the image processing apparatus acquires a color value and a transparency value of each of a plurality of target pixels included in first image data.

The first image data may include a color channel in which the color value of each of the plurality of target pixels included in the first image data is stored and an alpha channel in which the transparency value of each of the plurality of target pixels included in the first image data is stored. For example, red, green, blue (RGB) values may be stored in the color channel in the form of a bitmap. In addition, transparency values may be stored in the alpha channel in the form of a bitmap. However, this is only illustrative, and a method of storing the color value and the transparency value of each of the plurality of target pixels included in the first image data is not limited thereto.

According to an embodiment of the present disclosure, the image processing apparatus may acquire the color value and the transparency value of each of the plurality of target pixels included in the first image data by decoding the first image data acquired from the outside. According to an embodiment, the image processing apparatus may acquire the color values and the transparency values respectively stored in the color channel and the alpha channel of the first image data.

In operation S120, the image processing apparatus may determine a relationship between each of the plurality of target pixels and at least one background pixel included in different image data to be synthesized with the first image data, based on a characteristic of an object included in the first image data and the color value and the transparency value of each of the plurality of target pixels. Herein, the characteristic of the object indicates the nature by which a shape, a color, and the like of a different object are changeable when the object exists at a position corresponding to that of the different object. For example, the characteristic of the object may include a refractive index of the object and a magnification scale, a reduction scale, or the like with respect to the different object located at a position corresponding to that of the object. However, this is only illustrative, and the characteristic of the object is not limited thereto.

According to an embodiment of the present disclosure, the image processing apparatus may synthesize the first image data with at least a partial region of the different image data. To effectively synthesize the first image data with the different image data, the image processing apparatus may determine a relationship between a target pixel included in the first image data and at least one background pixel to be synthesized with the target pixel, based on a color value and a transparency value of the target pixel. Herein, the relationship between the target pixel and the at least one background pixel may be represented by a synthesis function.

For example, the image processing apparatus may select a synthesis function of blurring background pixels to be displayed around the target pixel such that the target pixel is clearly displayed. As another example, when the object included in the first image data is a magnifying glass, the image processing apparatus may select a synthesis function of synthesizing the target pixel and the at least one background pixel such that the different image synthesized with the first image data is magnified. As another example, the image processing apparatus may select a synthesis function of distorting the at least one background pixel corresponding to the target pixel. As another example, the image processing apparatus may select a synthesis function of converting a color value of the at least one background pixel corresponding to the target pixel.

In operation S130, the image processing apparatus may generate synthesis information indicating the relationship determined with respect to each of the plurality of target pixels.

According to an embodiment of the present disclosure, the image processing apparatus may store the synthesis information of each of the plurality of target pixels in a synthesis channel included in the first image data. According to an embodiment of the present disclosure, the image processing apparatus may store the synthesis information of each of the plurality of target pixels included in the first image data in a synthesis channel separated from the first image data. When the synthesis channel in which the synthesis information is stored is separated from the first image data, the image processing apparatus may transmit both the first image data and the synthesis channel to another device.

The device which has received the first image data may select arbitrary image data to be synthesized with the first image data and synthesize the first image data and the selected image data based on the synthesis information of the first image data. For example, when the device selects second image data as the different image data to be synthesized with the first image data, the device may synthesize each of the plurality of target pixels and at least one corresponding background pixel of the second image data based on the synthesis information of each of the plurality of target pixels included in the first image data. In this case, synthesized image data may be generated.

Figure 2:
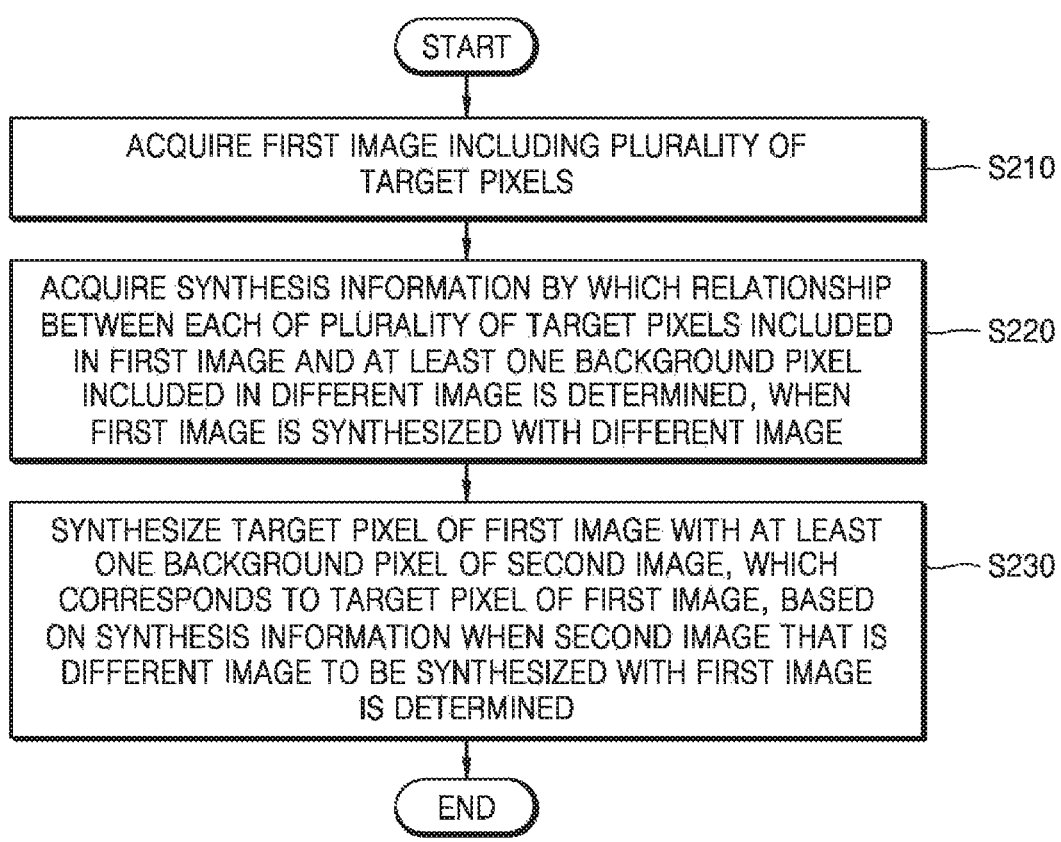
FIG. 2 illustrates a flowchart of a method by which an image processing apparatus synthesizes image data according to an embodiment of the present disclosure.

FIG. 2 illustrates a flowchart of a method by which an image processing apparatus synthesizes image data according to an embodiment of the present disclosure.

Referring to FIG. 2, in operation S210, the image processing apparatus may acquire first image data including a plurality of target pixels.

Herein, the first image data may include a color channel and an alpha channel, respectively indicating a color value and a transparency value of each of the plurality of target pixels included in the first image data. According to an embodiment of the present disclosure, the first image data may include a synthesis channel indicating synthesis information of each of the plurality of target pixels included in the first image data. However, this is only illustrative, and according to an embodiment, the synthesis channel may not be included in the first image data.

In operation S220, the image processing apparatus may acquire synthesis information by which a relationship between each of the plurality of target pixels included in the first image data and at least one background pixel included in different image data to be synthesized with the first image data is determined.

According to an embodiment of the present disclosure, the image processing apparatus may acquire the synthesis information of each of the plurality of target pixels included in the first image data by decoding the first image data. According to an embodiment, the image processing apparatus may acquire the synthesis information from a synthesis channel separated from the first image data.

In operation S230, when second image data that is the different image data to be synthesized with the first image data is determined, the image processing apparatus may synthesize a target pixel of the first image data with at least one background pixel of the second image data, which corresponds to the target pixel of the first image data, based on the synthesis information.

According to an embodiment of the present disclosure, when the first image data is synthesized with the different image data, the synthesis information may include information about a relationship between a target pixel included in the first image data and at least one background pixel included in the different image data. Herein, the relationship between the target pixel included in the first image data and the at least one background pixel included in the different image data may be represented by a synthesis function. The synthesis function may be set for each of the plurality of target pixels included in the first image data.

According to an embodiment of the present disclosure, the image processing apparatus may select second image data to be synthesized with the first image data. The image processing apparatus may arrange the first image data in at least a partial region of the selected second image data.

According to an embodiment of the present disclosure, the image processing apparatus may determine at least one background pixel of the second image data, which is to be synthesized with a target pixel of the first image data, based on the acquired synthesis information according to the arrangement of the first image data in the at least a partial region of the selected second image data.

According to an embodiment of the present disclosure, the image processing apparatus may generate synthesized image data by synthesizing the plurality of target pixels included in the first image data and a plurality of background pixels of the second image data according to the synthesis information of the first image data.

According to an embodiment of the present disclosure, the image processing apparatus may display the generated synthesized image data. According to an embodiment, the image processing apparatus may transmit the generated synthesized image data to an external device.

Figure 3:
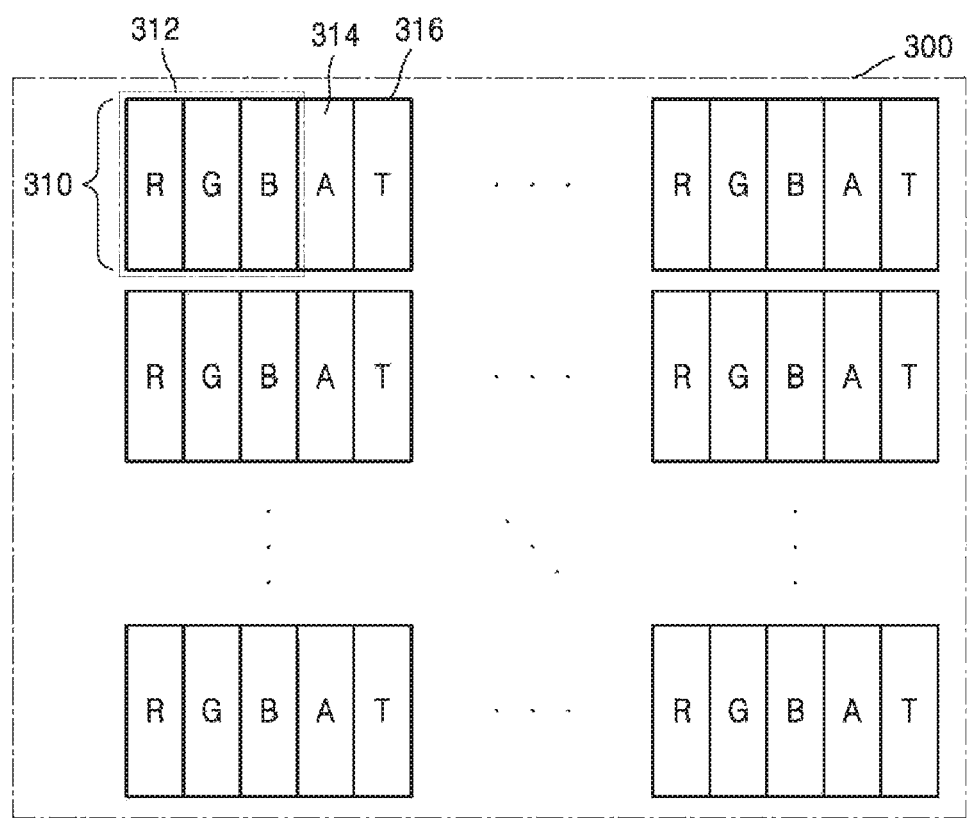
FIG. 3 illustrates synthesis information stored in a synthesis channel included in first image data according to an embodiment of the present disclosure.

FIG. 3 illustrates synthesis information stored in a synthesis channel included in first image data 300 according to an embodiment of the present disclosure.

According to an embodiment of the present disclosure, the first image data 300 may include a plurality of target pixels. Herein, the first image data 300 may include a color channel, an alpha channel, and a synthesis channel in which information indicating a characteristic of each of the plurality of target pixels is stored. For example, the color channel may store color values of the target pixels. The alpha channel may store transparency values of the target pixels. The synthesis channel may store synthesis information of the target pixels.

Referring to FIG. 3, an image processing apparatus may acquire a color value 312, a transparency value 314, and synthesis information 316 of a first target pixel 310 from among the plurality of target pixels. According to an embodiment of the present disclosure, the image processing apparatus may select second image data to be synthesized with the first image data, based on an input of a user. Herein, pixels included in the second image data are referred to as background pixels.

The image processing apparatus may determine at least one background pixel corresponding to the first target pixel 310 based on information about a position of a background pixel corresponding to the first target pixel 310, which is included in the synthesis information 316. The image processing apparatus may synthesize color values and transparency values of the first target pixel 310 and the determined at least one background pixel based on a synthesis function included in the synthesis information 316.

Figure 4:
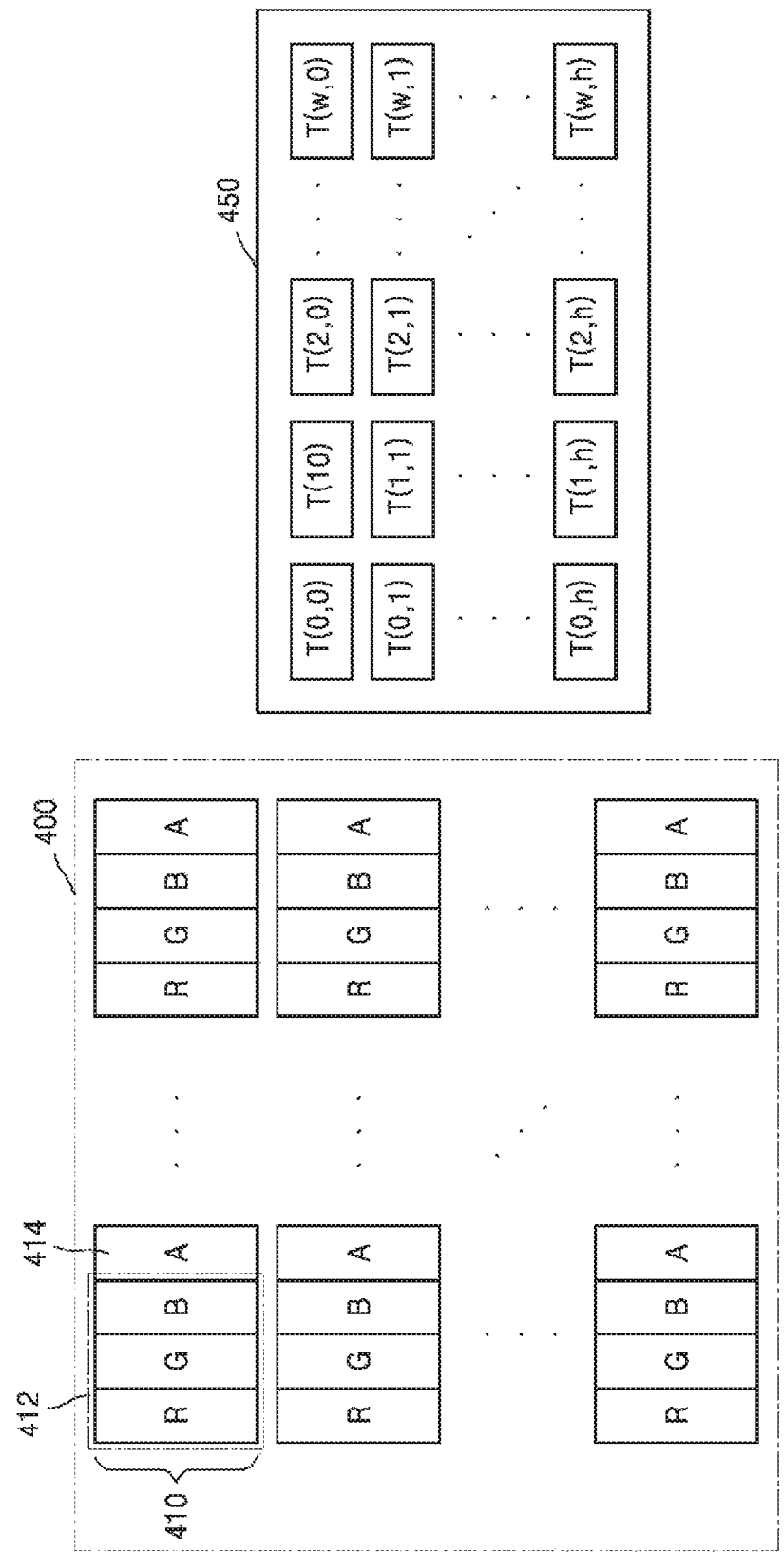
FIG. 4 illustrates synthesis information stored in a synthesis channel separated from first image data according to an embodiment of the present disclosure.

FIG. 4 illustrates synthesis information stored in a synthesis channel separated from first image data 400 according to an embodiment of the present disclosure.

According to an embodiment of the present disclosure, the first image data 400 may include a plurality of target pixels. Herein, the first image data 400 may include a color channel and an alpha channel in which information indicating a characteristic of each of the plurality of target pixels is stored. For example, the color channel may store color values of the target pixels. The alpha channel may store transparency values of the target pixels.

An image processing apparatus may acquire synthesis information 450 of the plurality of target pixels included in the first image data 400.

Referring to FIG. 4, the synthesis information 450 may exist in a channel form separated from the first image data 400. In addition, the synthesis information 450 may store information about a position of at least one background pixel, which corresponds to each of the plurality of target pixels, and a synthesis function.

Referring to FIG. 4, the image processing apparatus may acquire a color value 412 and a transparency value 414 of a first target pixel 410 from among the plurality of target pixels. According to an embodiment of the present disclosure, the image processing apparatus may select second image data to be synthesized with the first image data, based on an input of a user. Herein, pixels included in the second image data are referred to as background pixels.

The image processing apparatus may determine at least one background pixel corresponding to the first target pixel 410 based on information about a position of a background pixel corresponding to the first target pixel 410, which is included in the synthesis information 450. The image processing apparatus may synthesize color values and transparency values of the first target pixel 410 and the determined at least one background pixel based on the synthesis function included in the synthesis information 450.

According to an embodiment, synthesis information may be stored in advance in a software module of the image processing apparatus. When first image data and second image data are selected, the image processing apparatus may determine a relationship between each of a plurality of target pixels included in the first image data and each of a plurality of background pixels included in the second image data based on the pre-stored synthesis information. For example, the image processing apparatus may convert color values and transparency values of the plurality of target pixels and at least one background pixel corresponding to each of the plurality of target pixels based on the synthesis information.

Figure 5:
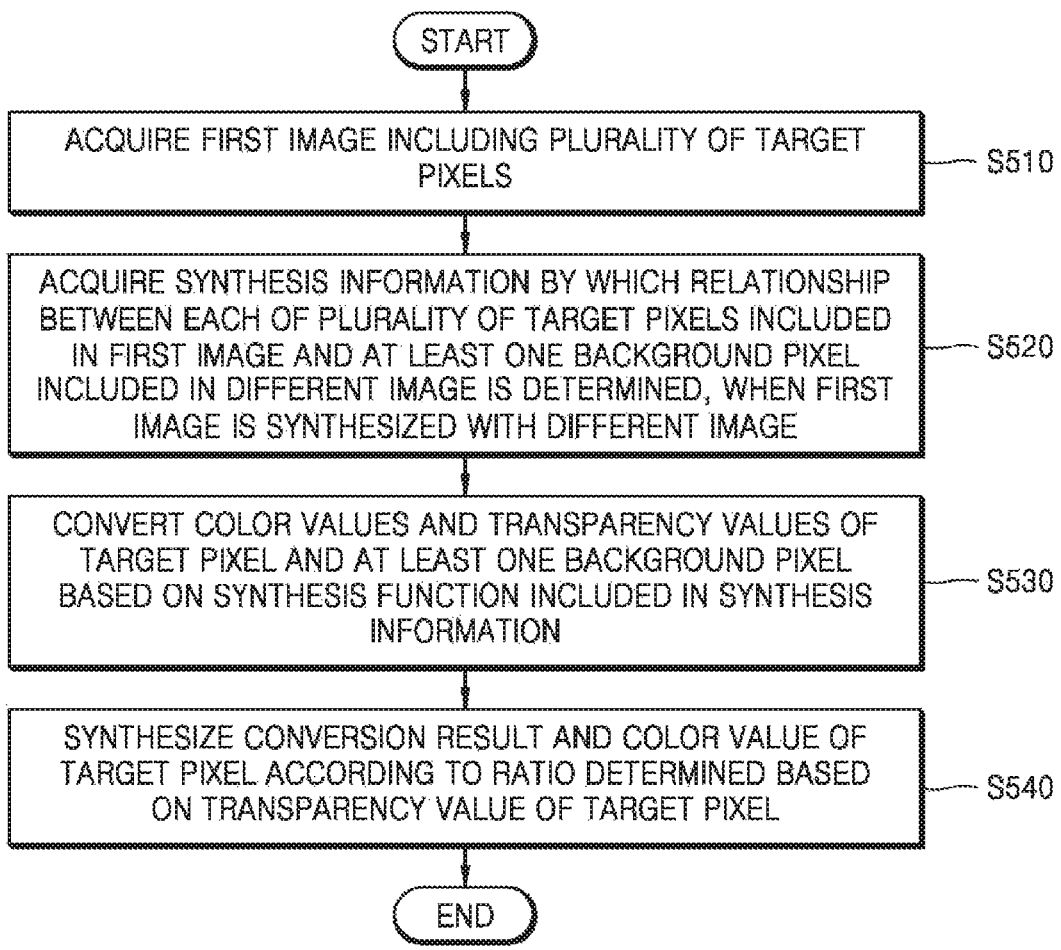
FIG. 5 illustrates a flowchart of a method by which an image processing apparatus synthesizes first image data and second image data based on synthesis information of the first image data according to an embodiment of the present disclosure.

FIG. 5 illustrates a flowchart of a method by which an image processing apparatus synthesizes first image data and second image data based on synthesis information of the first image data according to an embodiment of the present disclosure.

Referring to FIG. 5, in operation S510, the image processing apparatus may acquire the first image data including a plurality of target pixels.

Operation S510 may correspond to operation S210 described above with reference to FIG. 2.

In operation S520, the image processing apparatus may acquire synthesis information by which a relationship between each of the plurality of target pixels included in the first image data and at least one background pixel included in different image data to be synthesized with the first image data is determined when the first image data is synthesized with the different image data.

Operation S520 may correspond to operation S220 described above with reference to FIG. 2.

In operation S530, the image processing apparatus may acquire a converted pixel value from color values and transparency values of the target pixel and the at least one background pixel based on a synthesis function included in the synthesis information.

According to an embodiment of the present disclosure, the image processing apparatus may determine at least one background pixel to be synthesized with a target pixel, based on synthesis information of the target pixel. In addition, the image processing apparatus may convert color values and transparency values of the target pixel and the determined at least one background pixel by using a synthesis function included in the synthesis information of the target pixel.

According to an embodiment of the present disclosure, parameters of the synthesis function may include a width and a height of the first image data, a position of the target pixel, a color value and a transparency value of the target pixel, a width and a height of the second image data, a position of the determined at least one background pixel, and color values of a plurality of background pixels included in the second image data. The synthesis function may be represented by Equation 1 below.

However, this is only illustrative, and the parameters of the synthesis function are not limited to those in Equation 1.

$$It:[Ir, Ig, Ib, Ia, Ix, Iy, Iw, Ih, B, Bx, By, Bw, Bh] \rightarrow [r, g, b, a] \quad \text{Equation 1}$$

In Equation 1, Ir, Ig, and Ib denote color values of a red (R) color channel, a blue (B) color channel and a green (G) color channel of the target pixel of the first image data, respectively. In addition, Ia denotes the transparency value of the target pixel of the first image data, Ix and Iy denote the position of the target pixel in the first image data, and Iw and Ih denote the width and the height of the first image data.

In addition, B denotes an array consisting of the background pixels of the second image data, Bx and By denote the position, in the second image data, of the background pixel to be synthesized with the target pixel, and Bw and Bh denote the width and the height of the second image data.

In operation S540, the image processing apparatus may synthesize a result of the conversion and the color value of the target pixel according to a ratio determined based on the transparency value of the target pixel.

According to an embodiment of the present disclosure, the image processing apparatus may determine a color value and a transparency value of each of the plurality of pixels included in synthesized image data by synthesizing the converted pixel value, the color value of the target pixel, and the transparency value of the target pixel according to Equation 2 below (which is also equivalent to Equation 3 below).

$$C(x,y)=[Cr,Cg,Cb,Ca] \quad \text{Equation 2}$$

$$=(1-Ia)*It(Ir,Ig,Ib,Ia,Ix,Iy,Iw,Ih,B,Bx,By,Bw,Bh)+Ia*[Ir,Ig,Ib,1] \quad \text{Equation 3}$$

FIG. 6 illustrates a diagram for describing a method by which an image processing apparatus generates synthesized image data 630 by synthesizing first image data 610 and second image data 620 according to an embodiment of the present disclosure.

Referring to FIG. 6, the first image data 610 may include a plurality of target pixels. In FIG. 6, a method of generating the synthesized image data 630 is described by sampling a first target pixel 612 among the plurality of target pixels as an example for convenience of description.

According to an embodiment of the present disclosure, the image processing apparatus may select image data to be synthesized with the first image data 610 from among a plurality of different image data. For example, the image processing apparatus may select the second image data 620 from among the plurality of different image data based on an input of a user.

According to an embodiment of the present disclosure, the image processing apparatus may acquire synthesis information of the first image data 610. For example, the image processing apparatus may acquire the synthesis information by decoding the first image data 610. As another example, the image processing apparatus may acquire the synthesis information from a synthesis channel separated from the first image data 610.

According to an embodiment of the present disclosure, the image processing apparatus may select at least one background pixel (first to fourth pixels) 622, 624, 626, and 628 of the second image data 620, which corresponds to the first target pixel 612 based on the synthesis information. The image processing apparatus may exhibit a visual effect according to synthesis with the first target pixel 612 in more detail by selecting not only the second background pixel 624 of which a position corresponds to a position of the first target pixel 612 but also the first background pixel 622, the third background pixel 626, and the fourth background pixel 628 located around the second background pixel 624. Information about the at least one background pixel (the first to fourth pixels) 622, 624, 626, and 628 corresponding to the first target pixel 612, which is pre-set in the synthesis information, may be determined according to at least one of a type of a synthesis function included in the synthesis information and a color value and a transparency value of the first target pixel 612.

The image processing apparatus may synthesize color values and transparency values of the determined at least one background pixel (the first to fourth pixels) 622, 624, 626, and 628 and the first target pixel 612. For example, the image processing apparatus may convert the first target pixel 612 and the determined at least one background pixel (the first to fourth pixels) 622, 624, 626, and 628 according to the synthesis function included in the synthesis information. The image processing apparatus may determine a color value and a transparency value of a pixel 632 of the synthesized image data 630 by synthesizing the conversion result and the color value of the first target pixel 612 based on a ratio determined according to the transparency value of the first target pixel 612.

According to an embodiment of the present disclosure, the image processing apparatus may generate the synthesized image data 630 by synthesizing all target pixels included in the first image data 610 and background pixels included in the second image data 620 according to the method described above.

FIG. 7A illustrates a diagram for describing a method by which an image processing apparatus generates synthesized image data 730a based on first image data 710a and second image data 720a according to an embodiment of the present disclosure.

Referring to FIG. 7A, the image processing apparatus may acquire the first image data 710a and the second image data 720a. Herein, it is assumed that synthesis information about a plurality of target pixels included in the first image data 710a does not exist.

When the first image data 710a is arranged in at least a partial region of the second image data 720a, the image processing apparatus may synthesize color values and transparency values of the target pixels of the first image data 710a and background pixels of the second image data 720a, which exist at positions respectively corresponding to positions of the target pixels of the first image data 710a.

When the color values and the transparency values of the target pixels and selected background pixels are simply synthesized, an effect according to the synthesis of the first image data 710a and the second image data 720a may not be exhibited in the synthesized image data 730a. For example, even when an object included in the first image data 710a is glass having an effect of distorting an object in the background, the object distorting effect may not be exhibited in the synthesized image data 730a.

Figure 7B:
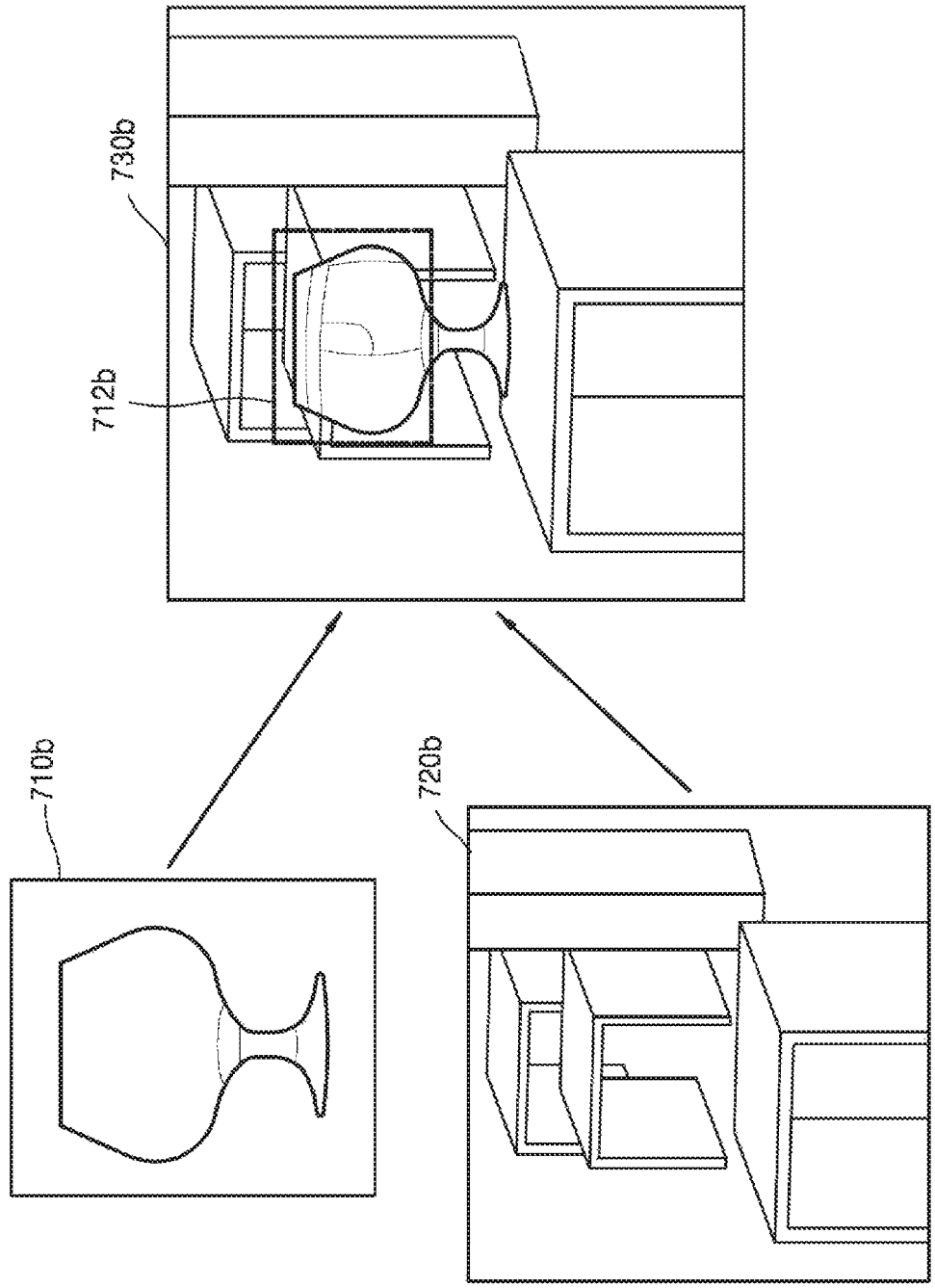
FIG. 7B illustrates a diagram for describing a method by which an image processing apparatus generates synthesized image data based on first image data and second image data according to an embodiment of the present disclosure.

FIG. 7B illustrates a diagram for describing a method by which an image processing apparatus generates synthesized image data 730b by synthesizing first image data 710b and second image data 720b according to an embodiment of the present disclosure.

Referring to FIG. 7B, the image processing apparatus may acquire the first image data 710b and the second image data 720b. According to an embodiment of the present disclosure, the image processing apparatus may acquire synthesis information of the first image data 710b. For example, the image processing apparatus may acquire the synthesis information by decoding the first image data 710b. As another example, the image processing apparatus may acquire the synthesis information from a synthesis channel separated from the first image data 710b.

The image processing apparatus may set so as for the first image data 710b to be arranged in at least a partial region of the second image data 720b. When a position of the first image data 710b in the second image data 720b is determined, the image processing apparatus may select at least one background pixel of the second image data 720b, which corresponds to each of a plurality of target pixels of the first image data 710b, based on the synthesis information of the first image data 710b.

The image processing apparatus may determine a synthesis function for each of the plurality of target pixels by using the synthesis information of the first image data 710b. For example, the image processing apparatus may determine a synthesis function to be applied to target pixels of a body region 712b of a goblet in the first image data 710b as a synthesis function of distorting a portion of the second image data 720b. FIG. 7B illustrates such distortion, as compared with FIG. 7A which does not. However, this is only illustrative, and examples of a synthesis function included in the synthesis information are not limited thereto.

According to an embodiment of the present disclosure, the image processing apparatus may synthesize the target pixels of the first image data 710b and background pixels of the second image data 720b based on the determined synthesis function. For example, the image processing apparatus may determine values of pixels constituting the synthesized image data 730b by applying the determined synthesis function, color values and transparency values of the target pixels and color values and transparency values of the background pixels to Equation 2 described above.

Figure 8A:
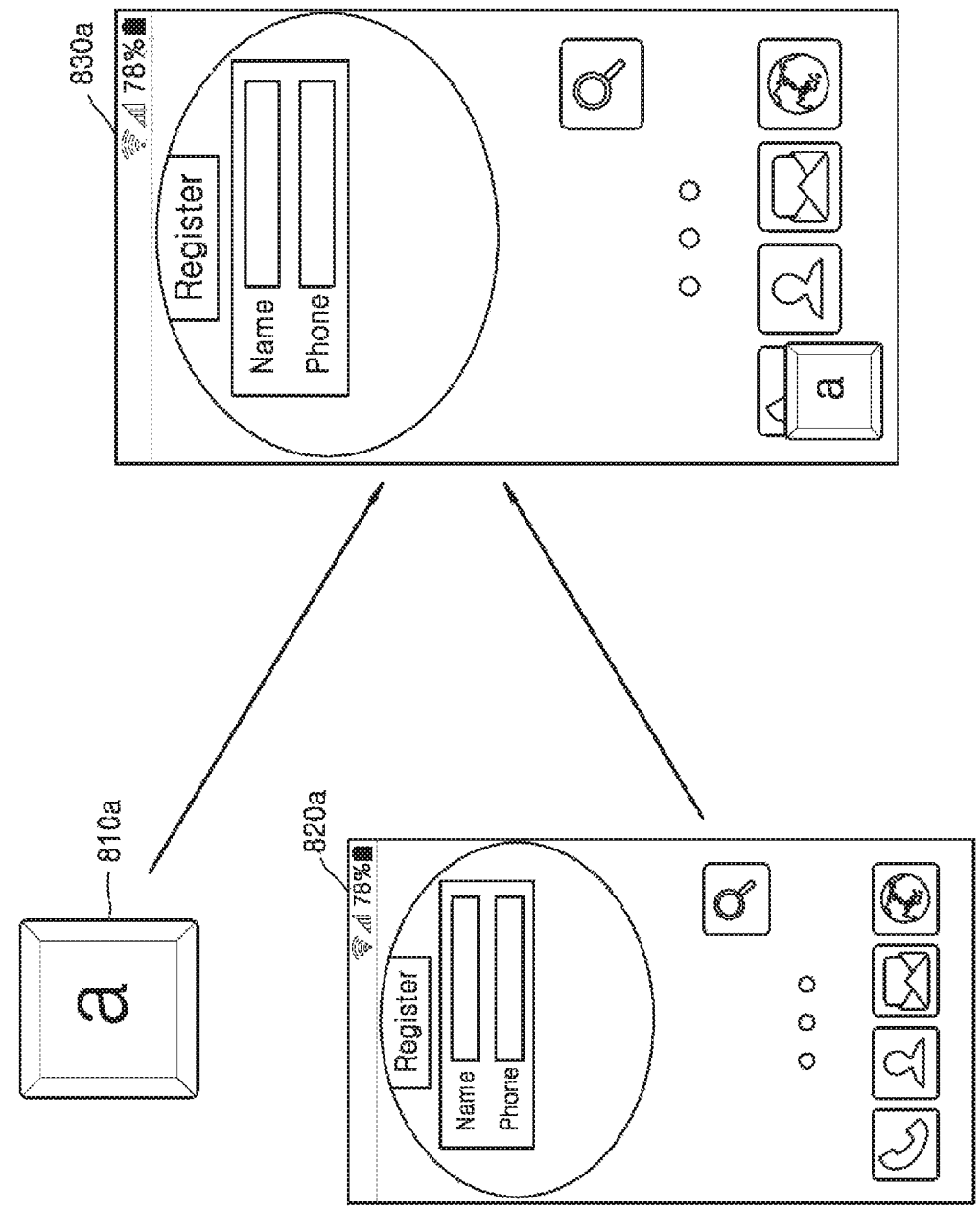
FIG. 8A illustrates a diagram for describing a method by which an image processing apparatus generates synthesized image data based on first image data including an input icon and second image data according to an embodiment of the present disclosure.

FIG. 8A illustrates a diagram for describing a method by which an image processing apparatus generates synthesized image data 830a based on first image data 810a including an input icon and second image data 820a according to an embodiment of the present disclosure.

Referring to FIG. 8A, the image processing apparatus may acquire the first image data 810a and the second image data 820a. Herein, it is assumed that synthesis information about a plurality of target pixels included in the first image data 810a does not exist.

When the synthesis information of the first image data 810a is not acquired, the image processing apparatus may simply synthesize color values and transparency values of the target pixels of the first image data 810a and background pixels of the second image data 820a. In this case, the synthesized image data 830a may be generated without taking into account a characteristic of color values and transparency values of the target pixels included in the first image data 810a. For example, when the transparency values of the target pixels included in the first image data 810a are high, it may be difficult for a user to concentrate content included in the first image data 810a in the synthesized image data 830a due to content included in the second image data 820a.

Figure 8B:
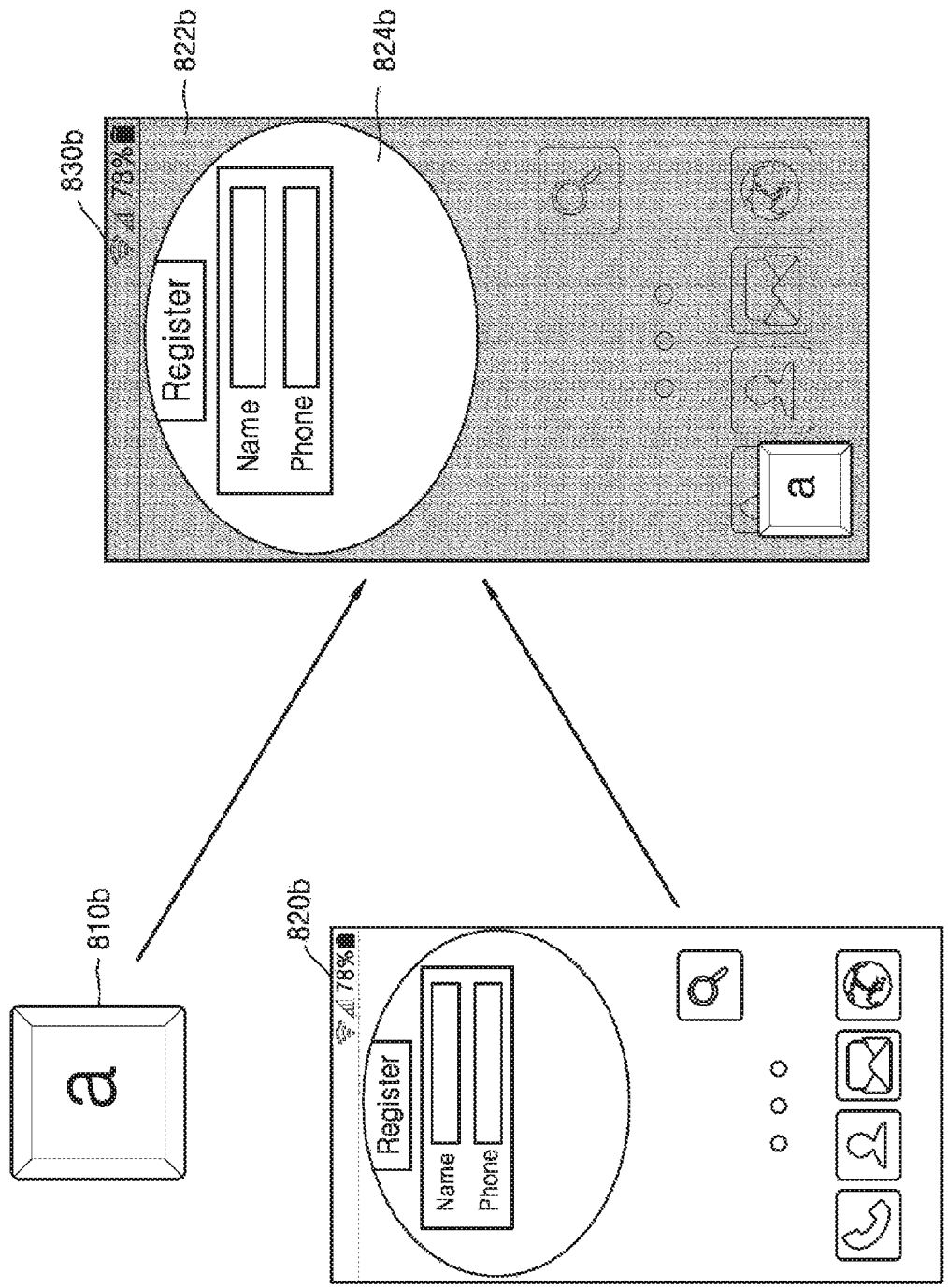
FIG. 8B illustrates a diagram for describing a method by which an image processing apparatus generates synthesized image data based on first image data including an input icon and second image data according to an embodiment of the present disclosure.

FIG. 8B illustrates a diagram for describing a method by which an image processing apparatus generates synthesized image data 830b based on first image data 810b including an input icon and second image data 820b according to an embodiment of the present disclosure.

Referring to FIG. 8B, the image processing apparatus may acquire the first image data 810b and the second image data 820b. According to an embodiment of the present disclosure, the image processing apparatus may acquire synthesis information of the first image data 810b. For example, the image processing apparatus may acquire the synthesis information by decoding the first image data 810b. As another example, the image processing apparatus may acquire the synthesis information from a synthesis channel separated from the first image data 810b.

The image processing apparatus may set so as for the first image data 810b to be arranged in at least a partial region of the second image data 820b. When a position of the first image data 810b in the second image data 820b is determined, the image processing apparatus may select at least one background pixel of the second image data 820b, which corresponds to each of a plurality of target pixels of the first image data 810b, based on the synthesis information of the first image data 810b.

The image processing apparatus may determine a synthesis function for each of the plurality of target pixels by using the synthesis information of the first image data 810b. For example, the image processing apparatus may determine a synthesis function to be used for synthesis of the first image data 810b and the second image data 820b as a synthesis function of blurring a remaining region 822b except for a partial region 824b of the second image data 820b, based on the synthesis information.

According to an embodiment of the present disclosure, the image processing apparatus may synthesize the target pixels of the first image data 810b and background pixels of the second image data 820b based on the determined synthesis function. For example, the image processing apparatus may determine values of pixels constituting the synthesized image data 830b by applying the determined synthesis function, color values and transparency values of the target pixels and color values and transparency values of the background pixels to Equation 2 described above. Accordingly, as shown in FIG. 8B, the content displayed in the remaining region 822b of the second image data 820b is blurred in the synthesized image data 830b.

Figure 9A:
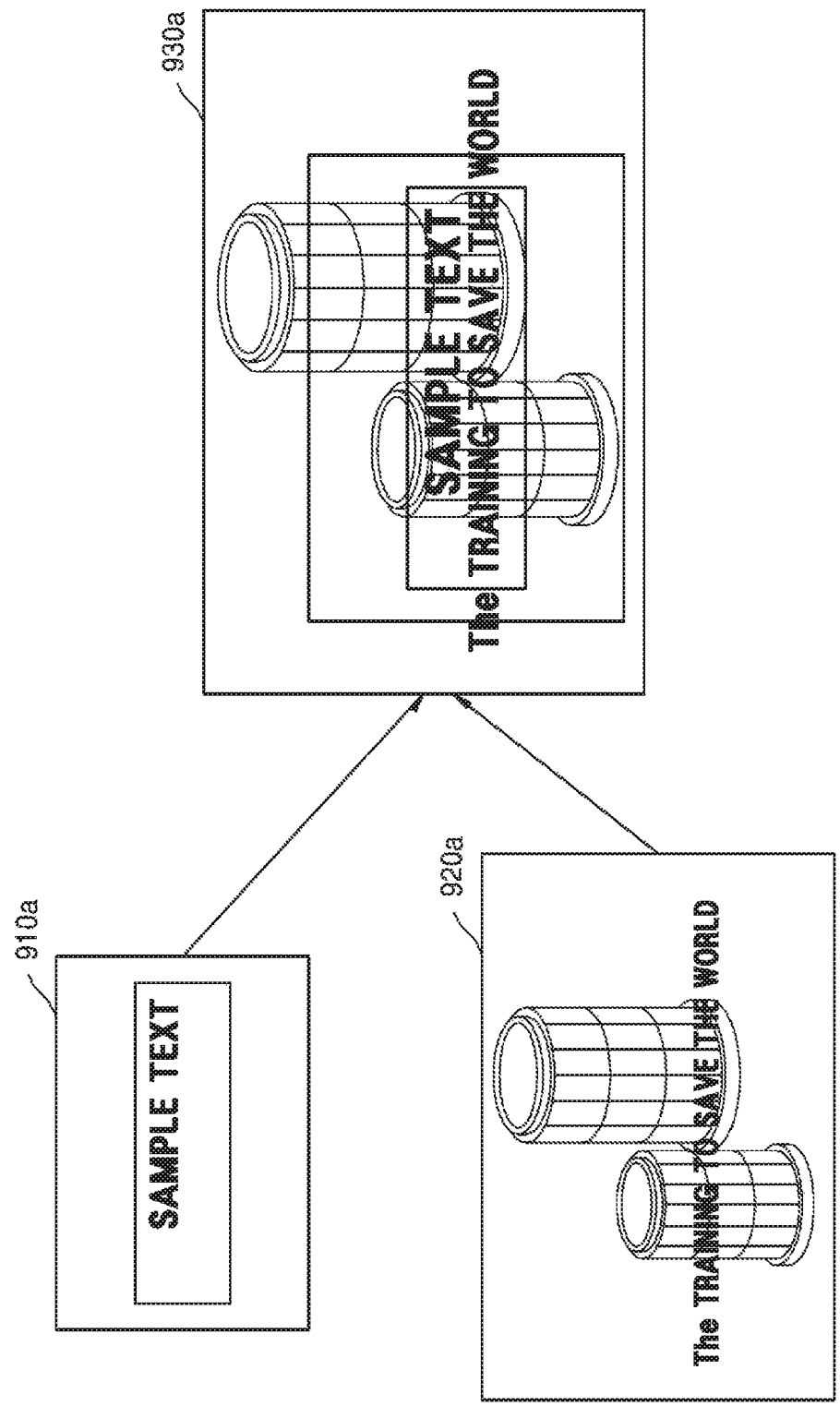
FIG. 9A illustrates a diagram for describing a method by which an image processing apparatus generates synthesized image data based on first image data including text and second image data according to an embodiment of the present disclosure.

FIG. 9A illustrates a diagram for describing a method by which an image processing apparatus generates synthesized image data 930a based on first image data 910a including text and second image data 920a according to an embodiment of the present disclosure.

Referring to FIG. 9A, the image processing apparatus may acquire the first image data 910a and the second image data 920a. Herein, it is assumed that synthesis information about a plurality of target pixels included in the first image data 910a does not exist.

When the synthesis information of the first image data 910a is not acquired, the image processing apparatus may simply synthesize color values and transparency values of the target pixels of the first image data 910a and background pixels of the second image data 920a. In this case, the synthesized image data 930a may be generated without taking into account a characteristic of color values and transparency values of the target pixels included in the first image data 910a. For example, when the color values of the target pixels included in the first image data 910a are similar to the color values of the background pixels included in the second image data 920a, it may be difficult for a user to recognize content included in the first image data 910a in the synthesized image data 930a due to content included in the second image data 920a.

Figure 9B:
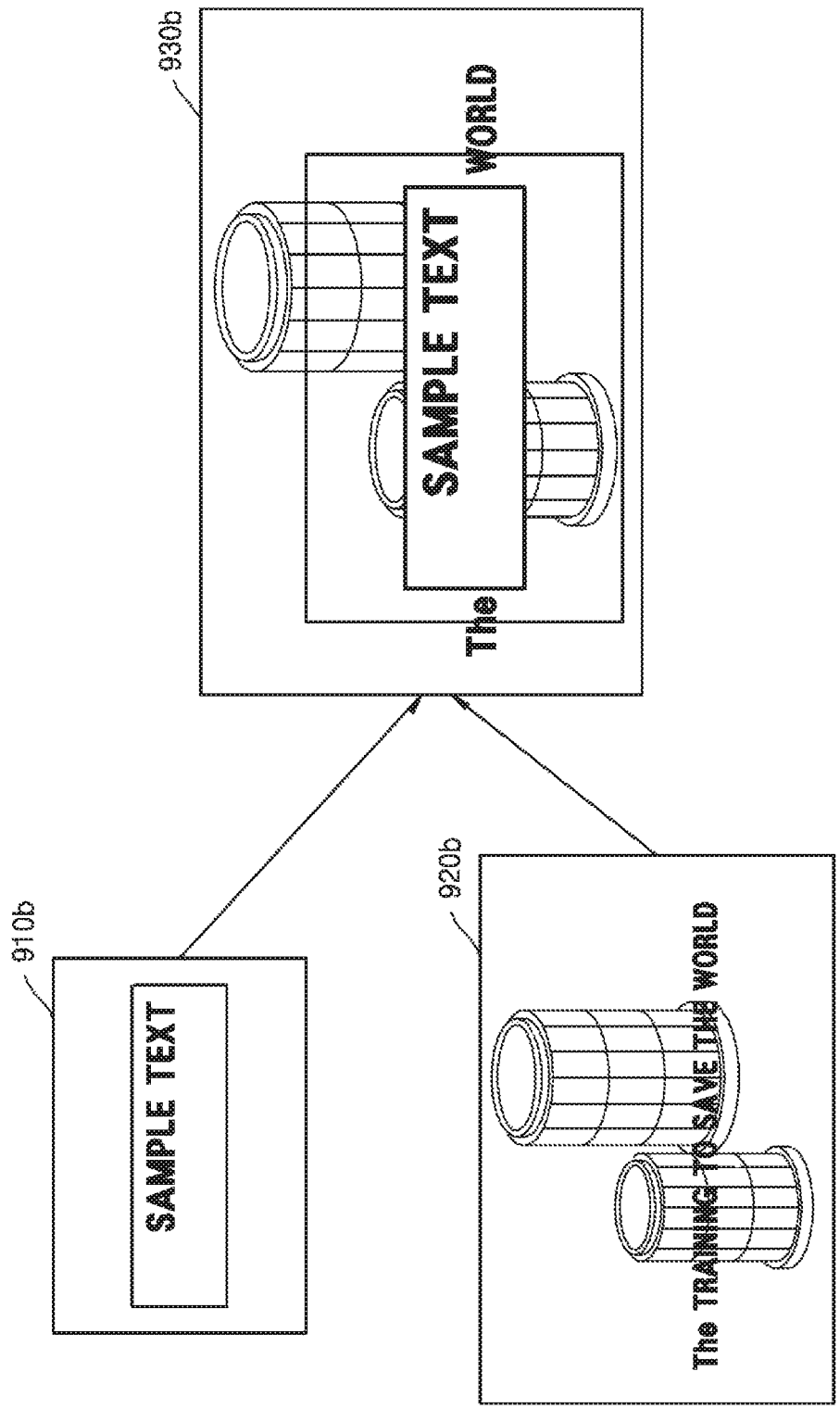
FIG. 9B illustrates a diagram for describing a method by which an image processing apparatus generates synthesized image data based on first image data including text and second image data according to an embodiment of the present disclosure.

FIG. 9B illustrates a diagram for describing a method by which an image processing apparatus generates a synthesized image data 930b based on first image data 910b including text and second image data 920b according to an embodiment of the present disclosure.

Referring to FIG. 9B, the image processing apparatus may acquire the first image data 910b and the second image data 920b. According to an embodiment of the present disclosure, the image processing apparatus may acquire synthesis information of the first image data 910b. In addition, the image processing apparatus may set so as for the first image data 910b to be arranged in at least a partial region of the second image data 920b. According to an embodiment of the present disclosure, when a position of the first image data 910b in the second image data 920b is determined, the image processing apparatus may select at least one background pixel of the second image data 920b, which corresponds to each of a plurality of target pixels of the first image data 910b, based on the synthesis information included in the first image data 910b.

The image processing apparatus may determine a synthesis function for each of the plurality of target pixels by using the synthesis information of the first image data 910b. For example, the image processing apparatus may determine a synthesis function to be used for synthesis of the first image data 910*b* and the second image data 920*b* as a synthesis function of decreasing transparency of target pixels, based on the synthesis information.

According to an embodiment of the present disclosure, the image processing apparatus may synthesize the target pixels of the first image data 910*b* and background pixels of the second image data 920*b* based on the determined synthesis function. For example, the image processing apparatus may determine values of pixels constituting the synthesized image data 930*b* by applying the determined synthesis function, color values and transparency values of the target pixels and color values and transparency values of the background pixels to Equation 2 described above. Accordingly, as shown in FIG. 9B, the transparency of the first image data 910*b* decreases in the synthesized image data 930*b*.

Figure 10:
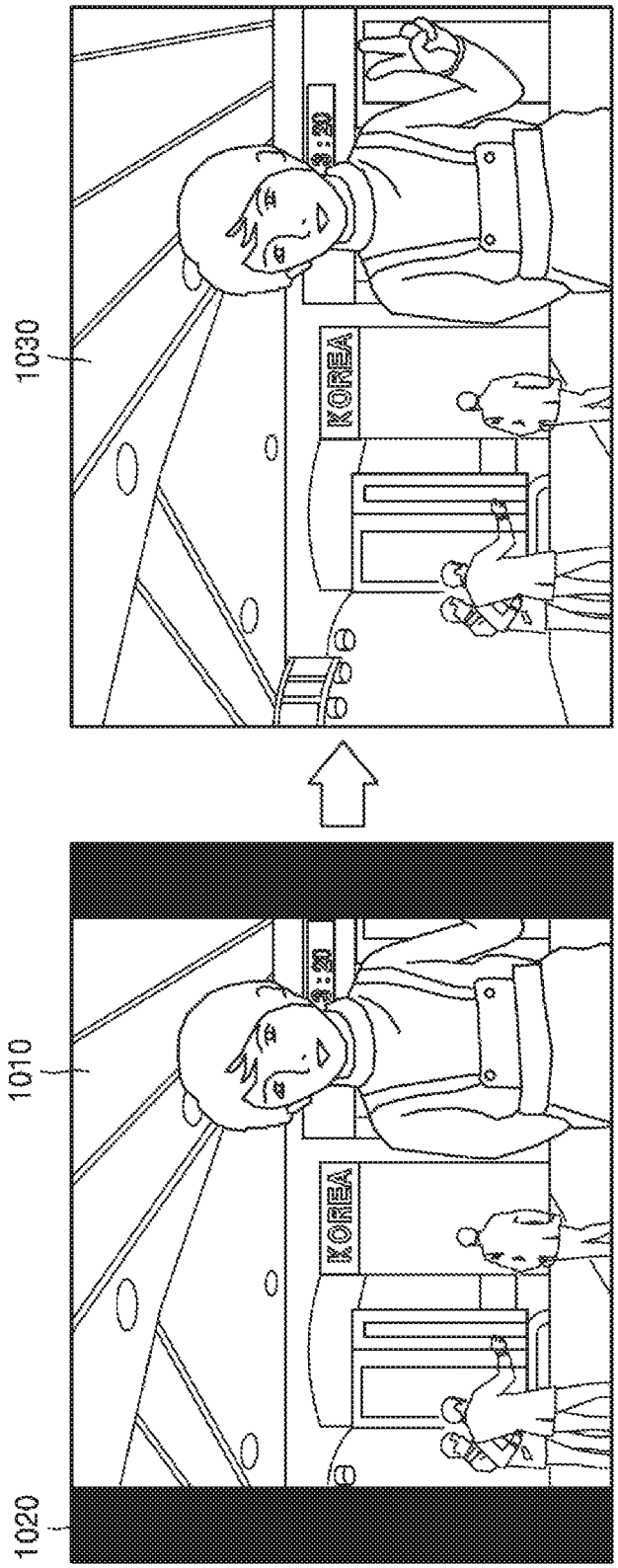
FIG. 10 illustrates a diagram for describing a method by which an image processing apparatus synthesizes first image data, which has a resolution that is different from a resolution set by the image processing apparatus, and second image data according to an embodiment of the present disclosure.

FIG. 10 illustrates a diagram for describing a method by which an image processing apparatus synthesizes first image data 1010, which has a resolution that is different from a resolution set by the image processing apparatus, and second image data 1020 according to an embodiment of the present disclosure.

Referring to FIG. 10, according to an embodiment of the present disclosure, when the resolution of the first image data 1010 differs from the resolution of the image processing apparatus, the image processing apparatus may generate synthesized image data 1030 corresponding to the resolution of the image processing apparatus by synthesizing the first image data 1010 and the second image data 1020. For example, the image processing apparatus may synthesize the first image data 1010 and the second image data 1020 based on synthesis information of the first image data 1010 such that content of the first image data 1010 expands and is displayed in a partial region of the second image data 1020. Herein, the partial region of the second image data 1020 may be a region, which does not correspond to the first image data 1010, in a display area of the image processing apparatus due to the resolution difference between the image processing apparatus and the first image data 1010.

Figure 11:
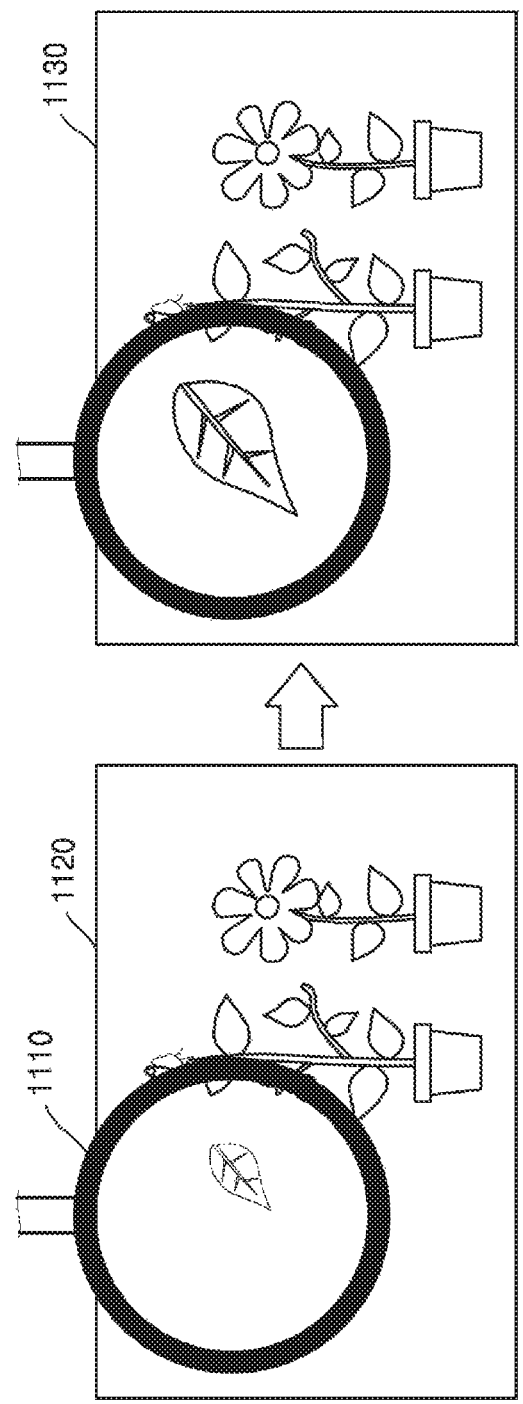
FIG. 11 illustrates a diagram for describing a method by which an image processing apparatus synthesizes first image data and second image data by magnifying a partial region of the second image data based on synthesis information of the first image data according to an embodiment of the present disclosure.

FIG. 11 illustrates a diagram for describing a method by which an image processing apparatus synthesizes first image data 1110 and second image data 1120 by magnifying a partial region of the second image data 1120 based on synthesis information of the first image data 1110 according to an embodiment of the present disclosure.

Referring to FIG. 11, according to an embodiment of the present disclosure, the image processing apparatus may acquire the synthesis information of the first image data 1110. Herein, it is assumed that the synthesis information of the first image data 1110 includes a synthesis function of magnifying different image data synthesized with the first image data 1110 since an object included in the first image data 1110 is a magnifying glass for magnifying an object.

According to an embodiment of the present disclosure, when the first image data 1110 is arranged on the second image data 1120, the image processing apparatus may determine at least one background pixel of the second image data 1120, which corresponds to each of a plurality of target pixels included in the first image data 1110. According to an embodiment of the present disclosure, the image processing apparatus may synthesize the target pixels and determined background pixels based on the synthesis information. For example, the image processing apparatus may synthesize the target pixels and determined background pixels by applying color values and transparency values of the target pixels and determined background pixels and a magnification function included in the synthesis information to Equation 2 described above.

According to an embodiment of the present disclosure, as a result of synthesizing the first image data 1110 and the second image data 1120 in the image processing apparatus, synthesized image data 1130 displayed by magnifying an object of the second image data 1120, which corresponds to the first image data 1110, may be acquired as shown in FIG. 11.

Figure 12:
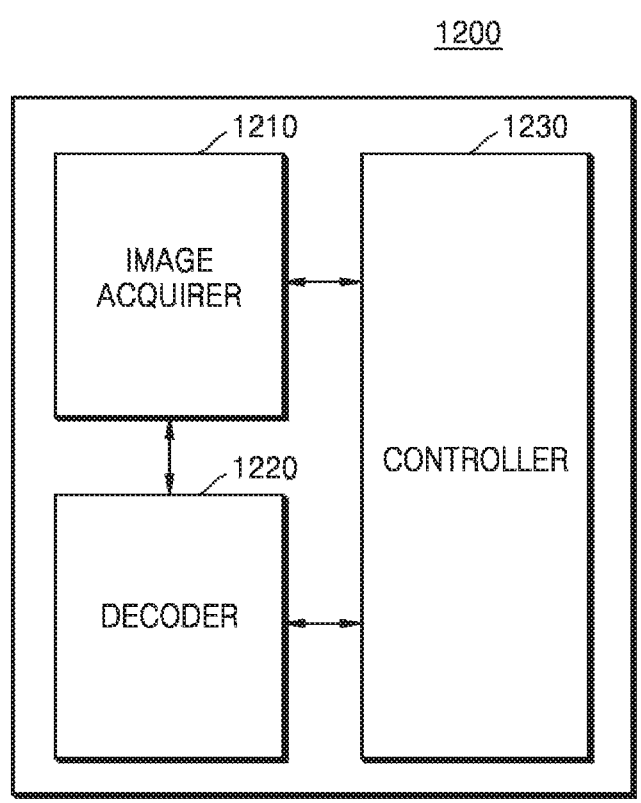
FIGS. 12 and 13 illustrate block diagrams of a first image processing apparatus according to various embodiments of the present disclosure.
Figure 13:
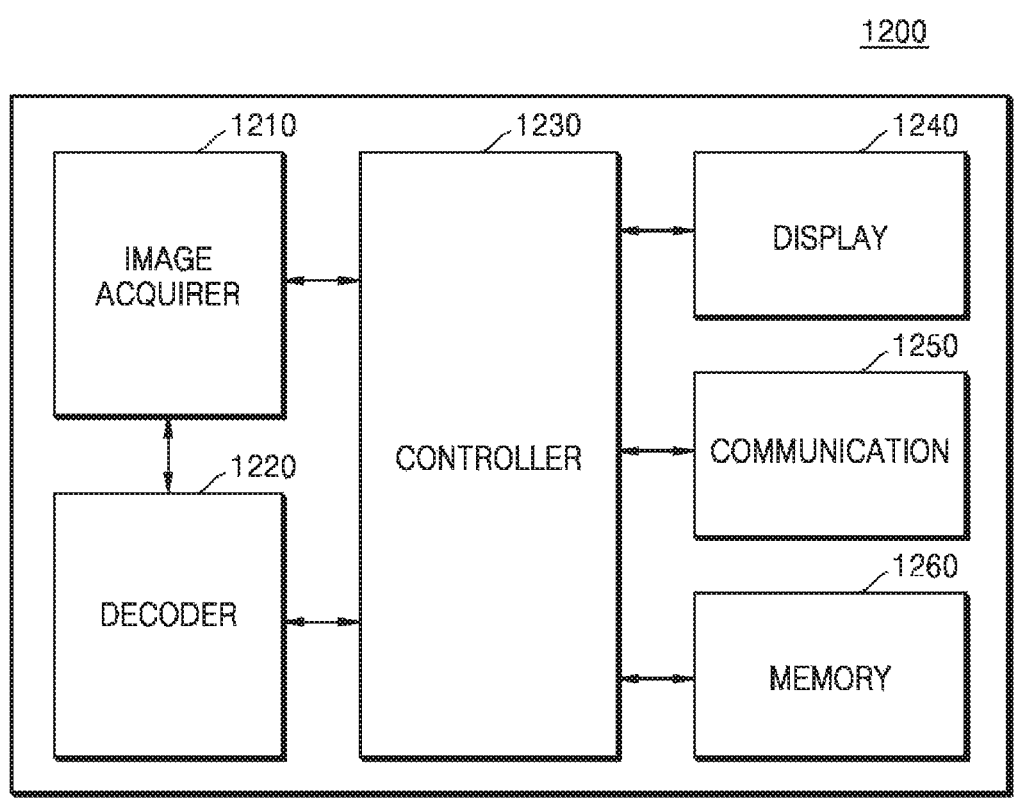

FIGS. 12 and 13 illustrate block diagrams of a first image processing apparatus 1200 according to various embodiments of the present disclosure.

Referring to FIG. 12, the first image processing apparatus 1200 according to an embodiment of the present disclosure may include an image acquirer 1210, a decoder 1220, and a controller 1230. However, not all the shown components are requisite components. The first image processing apparatus 1200 may be implemented by more or fewer components than the shown components.

For example, referring to FIG. 13, the first image processing apparatus 1200 according to an embodiment of the present disclosure may further include a display 1240, a communication unit 1250, and a memory 1260 in addition to the image acquirer 1210, the decoder 1220, and the controller 1230.

According to an embodiment of the present disclosure, the image acquirer 1210 may acquire first image data including a plurality of target pixels. Herein, the first image data may include a color channel in which a color value of each of the plurality of target pixels is stored, an alpha channel in which a transparency value of each of the at least one background pixel is stored, and a synthesis channel in which synthesis information of each of the plurality of target pixels is stored. However, this is only illustrative, and the synthesis channel in which the synthesis information is stored may be acquired independently from the first image data.

According to an embodiment of the present disclosure, the decoder 1220 acquires synthesis information by which a relationship between each of the plurality of target pixels included in the first image data and at least one background pixel included in different image data is determined, when the first image data is synthesized with the different image data. For example, the decoder 1220 may acquire the synthesis information of each of the plurality of target pixels included in the first image data from the synthesis channel included in the first image data. As another example, the decoder 1220 may acquire the synthesis information of each of the plurality of target pixels included in the first image data from a synthesis channel separated from the first image data.

The controller 1230 typically controls a general operation of the first image processing apparatus 1200. For example, the controller 1230 may generally control the image acquirer 1210, the decoder 1220, the display 1240, and the communication unit 1250 by executing programs stored in the memory 1260.

According to an embodiment of the present disclosure, when second image data that is the different image data to be synthesized with the first image data is determined, the controller 1230 may determine at least one background pixel of the second image data, which corresponds to a target pixel of the first image data, based on the synthesis information. For example, the controller 1230 may determine at least one background pixel of the second image data, which corresponds to each of the plurality of target pixels included in the first image data, based on the synthesis information.

According to an embodiment of the present disclosure, the controller 1230 may synthesize color values and transparency values of the target pixel and the determined at least one background pixel. For example, the controller 1230 may convert the color values and the transparency values of the target pixel and the at least one background pixel based on a synthesis function. The controller 1230 may synthesize the conversion result and the color value of the target pixel according to a ratio determined based on the transparency value of the target pixel.

According to an embodiment of the present disclosure, the display 1240 displays information processed by the first image processing apparatus 1200. For example, the display 1240 may display synthesized image data generated by synthesizing a target pixel of the first image data and at least one background pixel of the second image data. In addition, the display 1240 may display the first image data and the second image data in addition to the synthesized image data.

According to an embodiment of the present disclosure, the communication unit 1250 may include at least one component configured to communicate between the first image processing apparatus 1200 and an external device or between the first image processing apparatus 1200 and a server. For example, the communication unit 1250 may transmit the generated synthesized image data to the external device. As another example, the communication unit 1250 may acquire the first image data and the second image data from the external device. In this case, the communication unit 1250 may perform a function of the image acquirer 1210.

According to an embodiment of the present disclosure, the memory 1260 may store programs for processing and controlling of the controller 1230 and store input/output data (e.g., the first image data, the second image data, and the synthesized image data).

Figure 14:
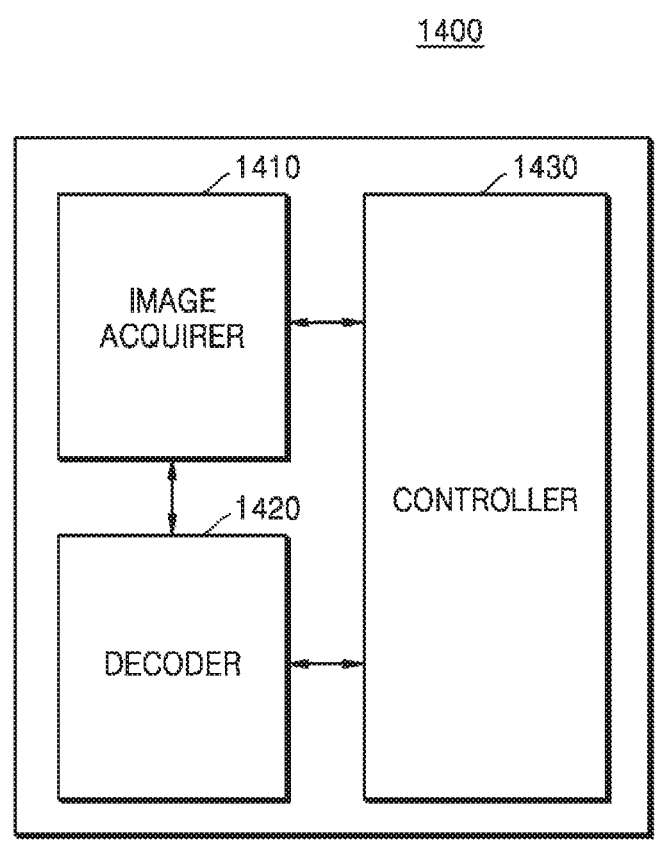
FIGS. 14 and 15 illustrate block diagrams of a second image processing apparatus according to various embodiments of the present disclosure.
Figure 15:
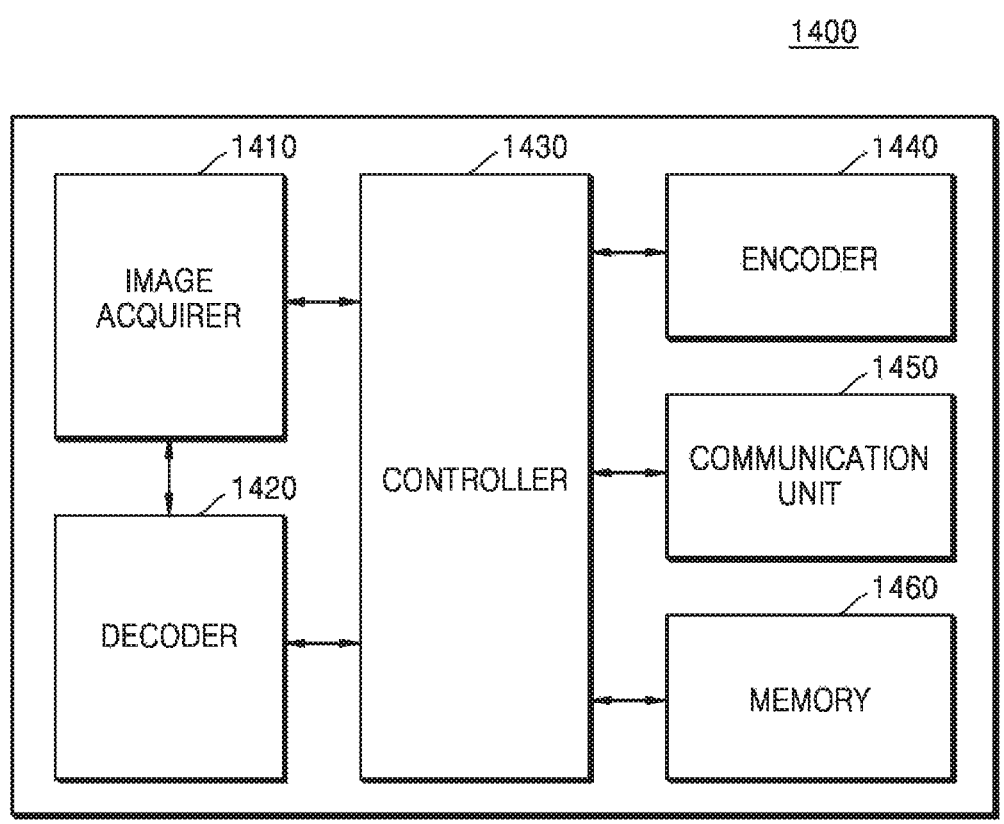

FIGS. 14 and 15 illustrate block diagrams of a second image processing apparatus 1400 according to various embodiments of the present disclosure.

Referring to FIG. 14, the second image processing apparatus 1400 according to an embodiment of the present disclosure may include an image acquirer 1410, a decoder 1420, and a controller 1430. However, not all the shown components are requisite components. The second image processing apparatus 1400 may be implemented by more or fewer components than the shown components.

For example, referring to FIG. 15, the second image processing apparatus 1400 according to an embodiment of the present disclosure may further include an encoder 1440, a communication unit 1450, and a memory 1460 in addition to the image acquirer 1410, the decoder 1420, and the controller 1430.

According to an embodiment of the present disclosure, the image acquirer 1410 acquires first image data. In addition, the image acquirer 1410 may acquire different image data to be synthesized with the first image data.

According to an embodiment of the present disclosure, the decoder 1420 acquires a color value and a transparency value of each of a plurality of target pixels included in the first image data.

The controller 1430 typically controls a general operation of the second image processing apparatus 1400. For example, the controller 1430 may generally control the image acquirer 1410, the decoder 1420, the encoder 1440, and the communication unit 1450 by executing programs stored in the memory 1460.

According to an embodiment of the present disclosure, the controller 1430 may determine a relationship between each of the plurality of target pixels and at least one background pixel included in the different image data to be synthesized with the first image data, based on the color value and the transparency value of each of the plurality of target pixels. In addition, the controller 1430 may generate synthesis information indicating the determined relationship with respect to each of the plurality of target pixels.

According to an embodiment of the present disclosure, the controller 1430 may store the synthesis information of each of the plurality of target pixels in a synthesis channel included in the first image data. According to an embodiment of the present disclosure, the controller 1430 may store the synthesis information of each of the plurality of target pixels included in the first channel in a synthesis channel separated from the first image data.

According to an embodiment of the present disclosure, the controller 1430 may identify an object included in the first image data. The controller 1430 may determine a relationship between each of the plurality of target pixels and at least one background pixel included in the different image data based on a characteristic of the identified object and the color value and the transparency value of each of the plurality of target pixels.

According to an embodiment of the present disclosure, when the first image data and second image data that is the different image data are selected, the controller 1430 may determine a relationship between each of the plurality of target pixels included in the first image data and each of a plurality of background pixels based on the pre-stored synthesis information. In this case, the controller 1430 may convert color values and transparency values of a target pixel and at least one background pixel based on the pre-stored synthesis information. In addition, the controller 1430 may synthesize the conversion result and the color value of the target pixel based on a synthesis function included in the synthesis information.

According to an embodiment of the present disclosure, the encoder 1440 may encode both a synthesis channel in which the synthesis information generated by the controller 1430 is stored and the first image data. When the synthesis channel is encoded together with the first image data, the first image data may include a color channel, an alpha channel, and the synthesis channel.

According to an embodiment of the present disclosure, the communication unit 1450 may include at least one component configured to communicate between the second image processing apparatus 1400 and an external device or between the second image processing apparatus 1400 and a server. For example, the communication unit 1450 may transmit the synthesis channel in which the synthesis information is stored and the first image data to the external device. As another example, the communication unit 1450 may acquire the first image data and at least one of different image data to be synthesized with the first image data from the external device. In this case, the communication unit 1450 may perform a function of the image acquirer 1410.

According to an embodiment of the present disclosure, the memory 1460 may store programs for processing and controlling of the controller 1230 and store input/output data (e.g., the first image data, the second image data, and the synthesized image data).

An apparatus according to the present embodiments may include a processor, a memory for storing and executing program data, a permanent storage such as a disk drive, a communication port for performing communication with an external device, and a user interface, such as a touch panel, a key, and a button. Methods implemented with a software module or an algorithm may be stored in a non-transitory computer-readable recording medium in the form of computer-readable codes or program instructions executable in the processor. Examples of the non-transitory computer-readable recording medium include magnetic storage media (e.g., read only memory (ROM), random access memory (RAM), floppy disks, hard disks, etc.) and optical recording media (e.g., compact disc ROMs (CD-ROMs), digital versatile discs (DVDs), etc.). The non-transitory computer-readable recording medium can also be distributed over network coupled computer systems so that the computer-readable code is stored and executed in a distributed fashion. The media can be read by a computer, stored in the memory, and executed by the processor.

All cited references including publicized documents, patent applications, and patents cited in the present disclosure can be merged in the present disclosure in the same manner as the shown by individually and concretely merging each cited reference and the shown by generally merging each cited reference in the present disclosure.

For the understanding of the present disclosure, reference numerals are disclosed in the embodiments shown in the drawings, and specific terms are used to describe the embodiments of the present disclosure. However, the present disclosure is not limited by the specific terms, and the present disclosure may include all components, which can be commonly thought by those of ordinary skill in the art. The present disclosure can be represented with functional blocks and various processing operations. These functional blocks can be implemented by various numbers of hardware and/or software configurations for executing specific functions. For example, the present disclosure may adopt direct circuit configurations, such as memory, processing, logic, and look-up table, for executing various functions under control of one or more processors or by other control devices. Like components of the present disclosure being able to execute the various functions with software programming or software elements, the present disclosure can be implemented by a programming or scripting language, such as C, C++, Java, or assembler, with various algorithms implemented by a combination of a data structure, processes, routines, and/or other programming components. Functional aspects can be implemented with algorithms executed in one or more processors. In addition, the present disclosure may adopt the prior art for electronic environment setup, signal processing and/or data processing. The terms, such as "mechanism", "element", "means", and "configuration", can be widely used and are not delimited as mechanical and physical configurations. The terms may include the meaning of a series of routines of software in association with a processor.

Specific executions described in the present embodiments are illustrative and do not limit the technical scope even in any method. For conciseness of the specification, disclosure of electronic configurations, control systems, software, and other functional aspects of the systems of the related art may be omitted. In addition, connections or connection members of lines between components shown in the drawings illustrate functional connections and/or physical or circuit connections, and the connections or connection members can be represented by replaceable or additional various functional connections, physical connections, or circuit connections in an actual apparatus. In addition, if there is no concrete use of terms such as "requisite" or "important" to refer a component, that component may not be necessarily required for application of the present disclosure.

The use of the term "said" or a similar directional term in the specification (in particular, in claims) may correspond to both the singular and the plural. In addition, when a range is disclosed, individual values belonging to the range are included (if there is no disclosure opposed to this), and this is the same as if each of the individual values forming the range is disclosed in the detailed description of the present disclosure. Finally, for operations forming the methods, if an order is not clearly disclosed or, if there is no disclosure opposed to the clear order, the operations can be performed in any order deemed proper. The methods are not necessarily limited to the disclosed order of the operations. The use of all illustrations or illustrative terms (for example, and so forth, etc.) is simply to describe the technical idea in detail, and the scope is not limited due to the illustrations or illustrative terms unless they are limited by claims. In addition, it will be understood by those of ordinary skill in the art that various modifications, combinations, and changes can be formed according to design conditions and factors within the scope of the attached claims or the equivalents.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown, and described with reference to the various embodiments thereof, it will be understood by those skilled in the art that various changes in form and details may be made therein without departing from the spirit and scope of the present disclosure as defined by the appended claims and their equivalents.

What is claimed is:

1. A method of image processing, comprising:
    acquiring a first image including a color channel for a color value, an alpha channel, and a synthesis channel;
    obtaining synthesis information from the synthesis channel of the first image, wherein the synthesis information includes a position and a value of a target pixel and a synthesis function of at least one target pixel of the first image for a synthesizing process; and
    synthesizing the target pixel of the first image with a background pixel of a second image based on the synthesis information, in response to the second image being determined,
    wherein the synthesizing comprises determining at least one background pixel in the second image for the at least one target pixel according to the synthesis function.

2. The method of claim 1, wherein the synthesis information includes the synthesis function in which at least one or more of the following are set as parameters:
    a color value and a transparency value of the target pixel,
    position information of the target pixel in the first image,
    a color value and a transparency value of the background pixel,
    position information of the background pixel in the second image,
    size information of the first image, and
    size information of the second image.

3. The method of claim 2, wherein the synthesizing of the target pixel comprises:

converting the color values and the transparency values of the target pixel and the background pixel based on the synthesis function; and synthesizing a result of the converting with the color value of the target pixel according to a ratio determined based on the transparency value of the target pixel.

4. The method of claim 1, wherein the first image comprises:

the color channel in which a color value of each of the plurality of target pixels is stored, the alpha channel in which a transparency value of the background pixel is stored, and the synthesis channel in which the synthesis information of each of the plurality of target pixels is stored.

5. A method of image processing, comprising:

acquiring a color value and a transparency value of each of a plurality of target pixels from a color value and an alpha channel included in a first image;

determining a position and a value of a target pixel included in the first image and a synthesis function of at least one target pixel for a synthesizing process based on the color value and the transparency value of each of the plurality of target pixels;

generating synthesis information based on the determined position and the value of the target pixel; and storing the synthesis information of each of the plurality of target pixels in a synthesis channel included in the first image, wherein, in response to a second image being determined, at least one background pixel in the second image for the at least one target pixel is determined according to the synthesis function and the at least one target pixel of the first image is synthesized with the at least one background pixel of the second image data based on the synthesis information.

6. An apparatus for image processing, comprising:

an inputter configured to acquire a first image including a color channel for a color value, an alpha channel, and a synthesis channel;

a decoder configured to obtain synthesis information from the synthesis channel of the first image, wherein the synthesis information includes a position and a value of a target pixel and a synthesis function of at least one target pixel of the first image for a synthesizing process; and at least one processor configured to determine at least one background pixel in a second image for the at least one target pixel according to the synthesis function in response to the second image being determined and synthesize a target pixel of the first image with a background pixel of the second image based on the synthesis information.

7. The apparatus of claim 6, wherein the synthesis information includes the synthesis function in which a color value and a transparency value of the target pixel, position information of the target pixel in the first image, a color value and a transparency value of the background pixel, position information of the background pixel in the second image, size information of the first image, and size information of the second image are set as parameters.

8. The apparatus of claim 7, wherein the at least one processor is further configured to:

convert the color values and the transparency values of the target pixel and the background pixel based on the synthesis function, and synthesize a result of the converting with the color value of the target pixel according to a ratio determined based on the transparency value of the target pixel.

9. The apparatus of claim 6, wherein the first image comprises:

the color channel in which a color value of each of the plurality of target pixels is stored, the alpha channel in which a transparency value of the background pixel is stored, and the synthesis channel in which the synthesis information of each of the plurality of target pixels is stored.

10. An apparatus for image processing, comprising:

an image acquirer configured to acquire a first image;

a decoder configured to acquire a color value and a transparency value of each of a plurality of target pixels from a color value and an alpha channel included in the first image; and at least one processor configured to:

determine a position and a value of a target pixel included in the first image and a synthesis function of at least one target pixel for a synthesizing process based on the color value and the transparency value of each of the plurality of target pixels, generate synthesis information based on the determined position and the value of the target pixel, and store the synthesis information of each of the plurality of target pixels in a synthesis channel included in the first image, wherein, in response to a second image being determined, at least one background pixel in the second image for the at least one target pixel is determined according to the synthesis function and the at least one target pixel of the first image is synthesized with the at least one background pixel of the second image data, based on the synthesis information.

11. A non-transitory computer-readable recording medium having recorded thereon at least one computer-readable program comprising commands, which when executed by a computer, performs a method, the method comprising:

acquiring a first image including a color channel for a color value, an alpha channel and a synthesis channel;

obtaining synthesis information from the synthesis channel of the first image, wherein the synthesis information includes a position and a value of a target pixel and a synthesis function of at least one target pixel of the first image for a synthesizing process; and synthesizing the target pixel of the first image with a background pixel of a second image based on the synthesis information, in response to the second image being determined, wherein the synthesizing comprises determining at least one background pixel in the second image for the at least one target pixel according to the synthesis function.

* * * * *